(12) United States Patent
Liu

(10) Patent No.: US 9,232,145 B2
(45) Date of Patent: Jan. 5, 2016

(54) HAND-HELD ELECTRONIC DEVICE AND DISPLAY METHOD

(71) Applicant: LENOVO (BEIJING) CO., LTD., Beijing (CN)

(72) Inventor: Junfeng Liu, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 262 days.

(21) Appl. No.: 13/867,543

(22) Filed: Apr. 22, 2013

(65) Prior Publication Data

US 2013/0278800 A1 Oct. 24, 2013

(30) Foreign Application Priority Data

Apr. 24, 2012 (CN) .......................... 2012 1 0122768
Jun. 1, 2012 (CN) .......................... 2012 1 0180138
Jun. 1, 2012 (CN) .......................... 2012 1 0180179

(51) Int. Cl.
*H04N 5/232* (2006.01)
*H04N 9/31* (2006.01)
*G06F 1/16* (2006.01)
(Continued)

(52) U.S. Cl.
CPC .......... *H04N 5/23296* (2013.01); *G02B 27/027* (2013.01); *G06F 1/1637* (2013.01); *G09G 3/001* (2013.01); *G09G 5/373* (2013.01); *H04N 9/3173* (2013.01); *H04N 9/3194* (2013.01); *G09G 2320/0261* (2013.01); *G09G 2330/022* (2013.01); *G09G 2340/045* (2013.01); *G09G 2340/0407* (2013.01); *G09G 2354/00* (2013.01); *G09G 2358/00* (2013.01)

(58) Field of Classification Search
CPC ....... G02B 5/04; G02B 26/08; G03B 7/09933
USPC .................................................. 348/344, 337
See application file for complete search history.

(56) References Cited

U.S. PATENT DOCUMENTS

| 6,029,073 | A | 2/2000 | Lebby et al. | |
| 2006/0146012 | A1* | 7/2006 | Arneson et al. | 345/156 |
| 2013/0235096 | A1* | 9/2013 | Liu | 345/697 |

FOREIGN PATENT DOCUMENTS

| CN | 101091377 A | 12/2007 |
| CN | 103309039 A | 9/2013 |

(Continued)

OTHER PUBLICATIONS

Chinese Patent Application No. 2012101801794, Chinese Patent Office, First Office Action mailed on Jan. 28, 2015; 9 pages.

(Continued)

*Primary Examiner* — Nelson D. Hernández Hernández
(74) *Attorney, Agent, or Firm* — Dentons US LLP

(57) ABSTRACT

The embodiments of the present disclosure provide a hand-held electronic device and a display method, the hand-held electronic device comprising an image processor configured to provide image data; a first display configured to display the first image based on the image data; a first optical system configured to receive light emitted from the first display and change the light path of the light emitted from the first display to form a first magnified virtual image, wherein the length of the light path between the first optical system and the first display is shorter than the focus of the first optical system; a first window configured to allow a viewer to see the first magnified virtual image through the first optical system when the viewer comes close to the first window.

20 Claims, 11 Drawing Sheets

(51) Int. Cl.
  *G02B 27/02* (2006.01)
  *G09G 3/00* (2006.01)
  *G09G 5/373* (2006.01)

(56) References Cited

FOREIGN PATENT DOCUMENTS

JP  2001311908 A  11/2001
JP  2004236101 A  8/2004

OTHER PUBLICATIONS

English Text of Chinese Patent Application No. 201210180179.4, Chinese Patent Office, First Office Action mailed on Jan. 28, 2015; 8 pages.
Chinese Patent Application No. 201210180138.5, Chinese Patent Office, First Office Action mailed on Jan. 29, 2015; 15 pages.
English Text of Chinese Patent Application No. 201210180138.5, Chinese Patent Office, First Office Action mailed on Jan. 29, 2015; 19 pages.
Chinese Patent Application No. 201210122768.7, Chinese Patent Office, First Office Action mailed on Feb. 26, 2015; 10 pages.
English Text of Chinese Patent Application No. 201210122768.7, Chinese Patent Office, First Office Action mailed on Feb. 26, 2015; 11 pages.
Chinese Patent Application No. 201210180138.5, Chinese Patent Office, Second Office Action mailed on Aug. 17, 2015; 14 pages.
English Text of the Second Office Action for Chinese Patent Application No. 201210180138.5, Chinese Patent Office, Second Office Action mailed on Aug. 17, 2015; 14 pages.
Chinese Patent Application No. 201210180179.4, Chinese Patent Office, Second Office Action mailed on Aug. 17, 2015; 14 pages.
English Text of Second Office Action for Chinese Patent Application No. 201210180179.4, Chinese Patent Office, Second Office Action mailed on Aug. 17, 2015; 12 pages.

\* cited by examiner

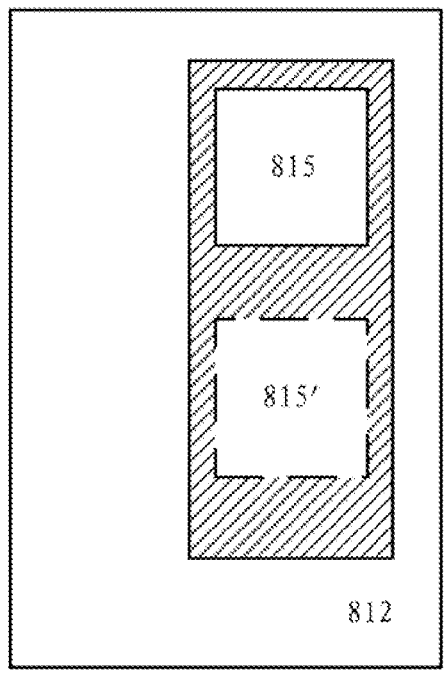
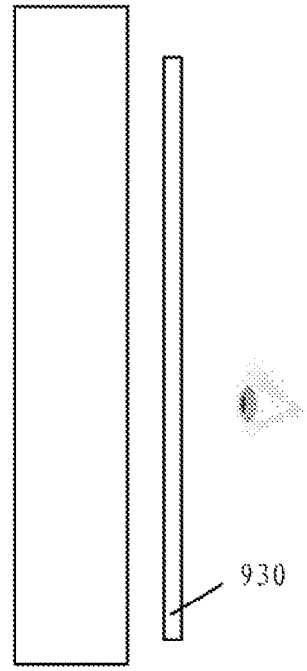
FIG. 9A　　　　　　　FIG. 9B
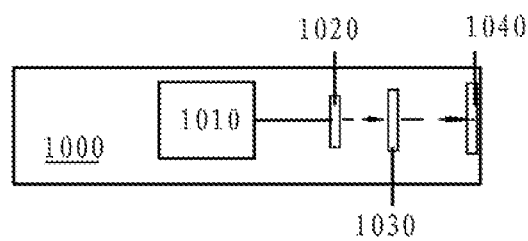
FIG. 10

HAND-HELD ELECTRONIC DEVICE AND DISPLAY METHOD

CROSS REFERENCE TO RELATED APPLICATIONS

This application claims the benefit under 35 U.S.C. §119 (a) of Chinese Patent Applications No. CN 201210122768.7, filed Apr. 24, 2012, CN 201210180138.5, filed Jun. 1, 2012, and CN 201210180179.4, filed Jun. 1, 2012; the entire disclosures of which are incorporated by reference herein in their entireties.

BACKGROUND

The present disclosure relates to a hand-held electronic device and a display method for a hand-held electronic device.

Presently, a hand-held electronic device with a big screen, such as a smart phone or the like, is very popular among users. The size of the screen of a hand-held electronic device is limited by the portability characteristics, which generally are not beyond 4 inches or 5 inches. However, with the development of technology, the processing capacity of the processor is enhanced, thus functions provided by the portable electronic device to the users are improved continuously, such that the screen size of the existing hand-held device can no longer meet the increasing diverse functional demands by the users. For example, the image size of the existing hand-held electronic device is small and the resolution of the display screen is low. The user would have a poor experience when watching a video through the hand-held electronic device. Accordingly, it is desired that a portable electronic device provide the user with a better visual experience while ensuring the portability of the electronic device.

SUMMARY

In view of the above, the embodiments of the disclosure provide a hand-held electronic device and a display method applied to the hand-held electronic device.

According to an aspect of the present disclosure, a hand-held electronic device is provided, comprising an image processor configured to provide image data; a first display configured to display a first image based on the image data; a first optical system configured to receive light emitted from the first display and change the light path of the light emitted from the first display to form a first magnified virtual image, wherein the length of the light path between the first optical system and the first display is shorter than the focus of the first optical system; and a first window configured to allow a viewer to see the first magnified virtual image through the first optical system when the viewer comes close to the first window.

According to another aspect of the present disclosure, a display method applied to a hand-held electronic device is provided, comprising providing image data by an image processor; displaying a first image based on the image data by a first display; receiving light emitted from the first display and changing the light path of the light emitted from the first display to form a first magnified virtual image by a first optical system, wherein the length of the light path between the first optical system and the first display is shorter than the focus of the first optical system.

In the hand-held electronic device and the display method, according to the embodiments of the disclosure, the watchable image size is not limited by the screen size of the hand-held device itself, such that the user may watch a display image with a relatively big size through the hand-held device while the portability of the hand-held device is kept. Additionally, compared with a micro-projector, the hand-held device and the display methods according to this embodiment have a considerably low consumption and are not limited by ambient light. The hand-held device and the display method, according to the embodiment of the disclosure, may be applied both outdoors with strong light and indoors with weak light.

Additionally, as described above, since the viewer can watch the first magnified virtual image through the first optical system, only when close to the first external surface, the content seen by the user is prevented from being seen by others to improve the privacy.

Additionally, with the hand-held electronic device and the display method according to the embodiments of the disclosure, the first state in which the hand-held electronic device displays a first image by the first display (e.g., the first state may be a normal use state of a mobile phone when the hand-held electronic device is the mobile phone), and the second state of the hand-held electronic device may be switched between each other, so as to control the on and off of the second display unit. Thereby, when the viewer does not need to watch the magnified image, the second display is turned off to save power.

BRIEF DESCRIPTION OF THE DRAWINGS

The present disclosure will become more fully understood from the detailed description given hereinafter and the accompanying drawings, which are given by way of illustration only, and thus, are not limitative of the present disclosure and wherein:

FIGS. 9A and 9B are schematic views showing the adjustment to the first display by the adjustor.

FIG. 10 is a schematic view showing a basic construction of a hand-held electronic device according to another embodiment of the present disclosure.

DETAILED DESCRIPTION

Hereinafter the embodiments of the disclosure will be described with reference to the accompany drawings. It is noted that like reference numbers are used to represent that with like step and element and the repeated explanation for them will be omitted.

Figure 1:
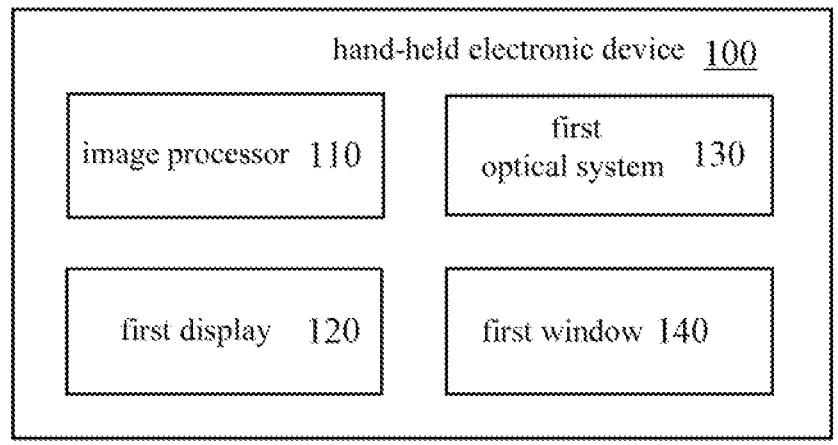
FIG. 1 shows an exemplary block diagram of a hand-held electronic device according to an embodiment of the disclosure.

In the following embodiment of the disclosure, the concrete form of a hand-held electronic device comprises, but is not limited to, a mobile phone, a personal digital assistant, a media player (for example MP4), a play station, a tablet computer, a GPS device, and the like. FIG. 1 shows an exemplary block diagram of a hand-held electronic device 100 according to an embodiment of the disclosure. As shown in FIG. 1, the hand-held electronic device 100 comprises an image processor 110, a first display 120, a first optical system 130, and a first window 140.

The image processor 110 may provide a first image or image data of a first image. The first image may be, for example, a picture, a video image, a text, or a combination of a picture and a text, or the like. The image processor 110 may be a central processing unit (for example a CPU) of the hand-held electronic device, or alternatively, may also be a separate image processor physically or logically.

The first display 120 may display the first image provided by the image processor 110 or according to the image data provided by the image processor 110. According to an example of the disclosure, the first display 120 may be a micro-display, which has a smaller screen size than that of the existing hand-held device. Additionally, according to another embodiment of the disclosure, the first display 120 has a relatively high resolution. Specifically, the resolution of the screen of the first display 120 may be higher than that of the existing hand-held device. For example, the first display 120 may employ a display screen meeting the high definition or the full high definition standard. Since the screen size of first display 120 is very small, in the example of the disclosure, it is difficult for a user to see the first image displayed by the first display 120 through naked eyes. Additionally, in the case that the screen of the hand-held device has a relatively high resolution, the resolution of the screen of first display 120 may be equal to that of the hand-held device.

The first optical system 130 may receive light emitted from the first display 120 and change the light (optical) path for the light emitted from the first display 120 to form a first magnified virtual image, wherein the length of the light path between the first optical system 130 and the first display 120 is less than the focus of first optical system. That is to say, the first optical system 130 has a positive refractive power. The magnification of first optical system 130 may be set in advance. Alternatively, the first optical system 130 may comprises a first adjusting component to adjust the magnification of first optical system 130, which will be described later in detail. The area of the first magnified virtual image is greater than the area of the display region of the first display.

Figure 2A:
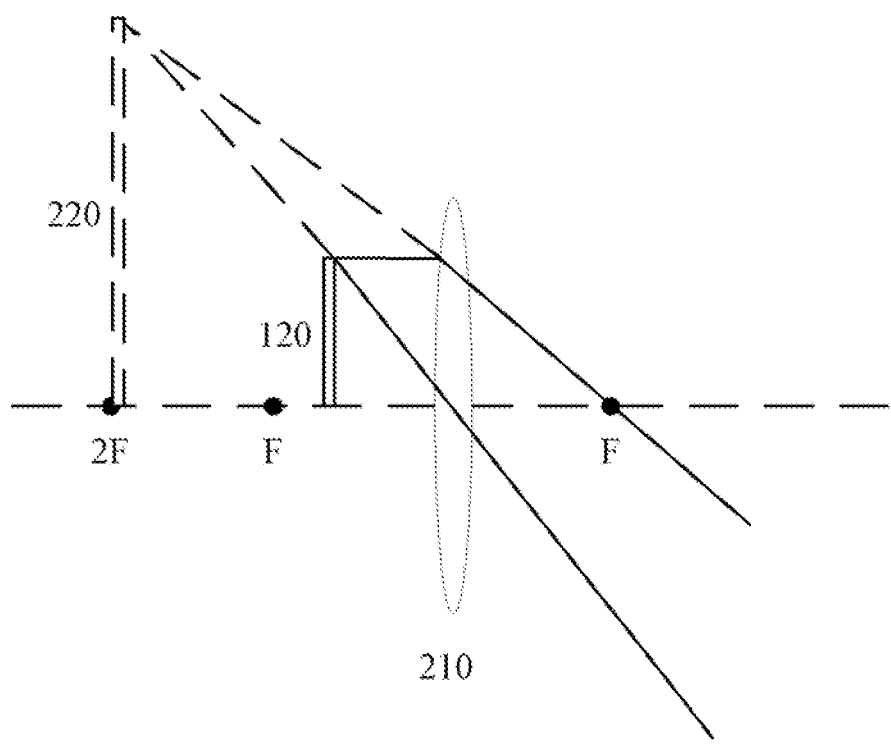
FIG. 2A is a schematic view showing a lens assembly according to an example of the present disclosure.

According to an example of the disclosure, the first optical system 130 comprises of at least a lens assembly having a positive refractive power. FIG. 2A is a schematic view showing the lens assembly according to an example of the disclosure. As shown in FIG. 2, the lens assembly may comprise a convex lens 210. The convex lens 210 may receive light emitted from the first display 120 and change the light path for the light emitted from the first display 120 to form the first magnified virtual image 220.

Although the light path change for the light emitted from the first display 120 is described by taking a beam of light ray as an example in FIG. 2A, it should be noted that actually those emitted from the first display 120 is a set of light composed of multiple beams of light rays, and the light path of the set of light rays is changed by the convex lens 210 to form the first magnified virtual image 220.

Figure 2B:
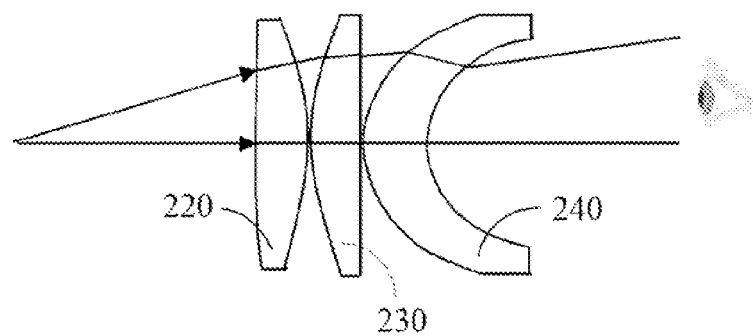
FIG. 2B is a schematic view showing a lens assembly according to another example of the present disclosure.

Additionally, to reduce and avoid the interference to imaging caused by the aberration and the dispersion to provide to the user a better visual experience, the lens assembly may be formed of a plurality of lenses including convex lens and concave lens. As described above, this lens assembly formed of a plurality of lenses has a positive refractive power, i.e., is equivalent to convex lens. FIG. 2B is a schematic view showing a lens assembly according to another example of the disclosure. As shown in FIG. 2B, the lens assembly may comprise a single convex lens 220, a single convex lens 230, and a concave-convex lens 240.

The image processor 110, the first display 120, and the first optical system 130 may be disposed inside the hand-held electronic device 100. The first window 140 may be disposed on a first external surface of the hand-held electronic device 100 to enable the viewer to see the first magnified virtual image through the first optical system when close to the first external surface. According to one example of the disclosure, the size of first window 140 may correspond to that of the human eye, and the first window 140 may be disposed on the first external surface of the casing of the hand-held electronic device.

According to one example of the disclosure, in the hand-held electronic device, the first display 120 is disposed on a side of the first optical system 130, which allows the viewer to see the first magnified virtual image on the other side of the first optical system, which is opposite to the first display 120.

With the hand-held electronic device provided by the above embodiment of the disclosure, the watchable image size is not limited by the screen size of the hand-held device itself, such that the user may watch a display image with a relatively large size through the hand-held device while the portability of the hand-held device is kept. Additionally, compared with a micro-projector, the hand-held device according to this embodiment has a considerably low consumption and is not limited by ambient light. The hand-held device, according to the embodiment of the disclosure, may be used to watch a video or a picture both in outdoors with strong light and indoors with weak light.

Additionally, as described above, since the viewer can see the first magnified virtual image through the first optical system, only when close to the first external surface, such that the content seen by the user is prevented from being seen by others so as to improve the privacy.

Figure 3:
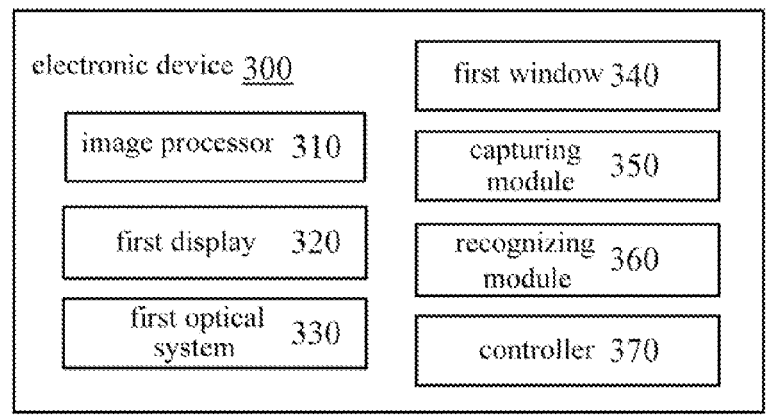
FIG. 3 is an exemplary block diagram of a hand-held electronic device according to another embodiment of the present disclosure.

FIG. 3 is a basic construction example showing a hand-held electronic device 300 according to another embodiment of the disclosure. Similar to the hand-held electronic device 100 shown in FIG. 1, a hand-held electronic device 300 comprises an image processor 310, a first display 320, a first optical system 330, and a first window 340. Additionally, the hand-held electronic device 300 further comprises a capturing module 350, a recognizing module 360, and a controller 370.

The image processor 310 may provide a first image or image data of the first image. The first image may be, for example, a picture, a video image, or a combination of a text and a picture, and the like. The first display 320 may display the first image provided by the image processor 310 or according to the image data provided by the image processor 310. As shown in FIG. 3, in this embodiment, the first display 320 is a micro-display disposed inside the hand-held electronic device 300. Since the screen size of the first display 320 is very small, in this embodiment, it is difficult for a user to see the first image displayed clearly by the first display 320 through human eyes.

The first optical system 330 may receive light emitted from the first display 320 and change the light path for the light emitted from the first display to form a first magnified virtual image. That is, the first optical system 330 has a positive refractive power.

The first window 340 may be disposed on a first external surface of the hand-held electronic device, to enable the viewer to see the first magnified virtual image through the first optical system 330. As shown in FIG. 3, the size of first window 340 may correspond to that of the human eyes. The first window 340 and the first optical system 330 may be disposed correspondingly along the optical axis of the first optical system 330. The first display 320 is disposed on a side of the first optical system 330, and the first window 340 is disposed on the other side of the first optical system 330, which is opposite to the first display 320, which allows the viewer to see the first magnified virtual image. The first window 340 may be disposed on the first external surface of the casing of the hand-held electronic device 300.

The capturing module 350 may capture the image of the eye of the viewer when the viewer comes close to the first external surface to see the first magnified virtual image. For example, the capturing module 350 may be a capturing component disposed within the hand-held electronic device 300. Alternatively, the capturing module 350 may also be a capturing array composed of multiple capturing components disposed within the hand-held electronic device 300.

According to an example of the present disclosure, the first display 320, the capturing module 350, the first optical system 330, and the first window, 340 are disposed along the optical axis of the first optical system 330 correspondingly. For example, when the first display 320 comprises a display array containing multiple display units, the capturing module 350 may comprise a capturing array containing multiple capturing components, which is disposed correspondingly with respect to the display array. For example, the display array and the capturing array may be disposed in such a way that a capturing component is configured between two adjacent displaying units. In particular, the displaying units of the display array and the capturing components of the capturing array may be disposed alternately every other column and every other row. Additionally, the display array and the capturing array may be disposed in the same plane. Alternatively, the display array and the capturing array may be disposed in different planes. For example, the capturing array is disposed on a side of the display array far from the first window 340, or on a side of the display array close to the first window 340.

In addition, when the capturing module, the first display, the first optical system, and the first window are disposed along the optical axis of the first optical system correspondingly, the first display may be a transparent display screen, or the first display may switch between a transparent stat and a non-transparent (opaque) state with a predetermined time interval when displaying the first image. Thereby, when displaying the first image, the light incident from the first window may pass the first display to reach the capturing module, and the capturing module may be disposed on a side of the first display far from the first window. In the present example, the capturing module may be one or more capturing components disposed on a side of the first display far from the first window.

The capturing module may be formed in a simple structure and the location of the capturing module may be determined easily, by configuring the first display as a transparent display screen, or by switching the first display between the transparent state and the non-transparent state with the predetermined time interval when display the first image.

Alternatively, according to another example of the present disclosure, the first display 320 and the completely capturing module 350 are not necessary to be disposed correspondingly along the optical axis of the first optical system 330. For example, the capturing module 350 may comprise a first optical component and a capturing component. The first optical component may transmit the eye image signal to the capturing component. Thereby, the location of the capturing component in the hand-held electronic device may be determined more flexibly according to different design needs.

Figure 4:
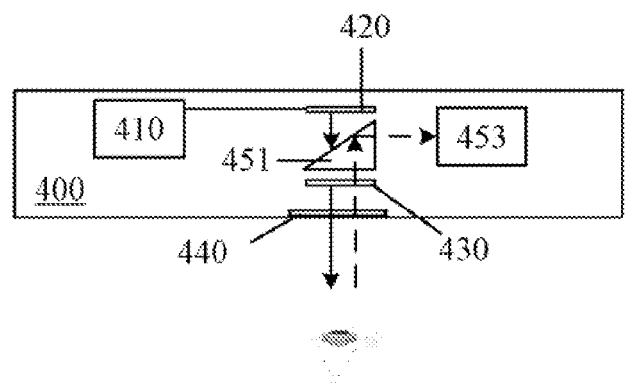
FIG. 4 is a basic construction example of a hand-held electronic device according to another embodiment of the present disclosure.

FIG. 4 is a basic construction example showing a hand-held electronic device 400 according to another embodiment of the disclosure. Similar to the hand-held electronic device 100 shown in FIG. 1, the hand-held electronic device 400 comprises an image processor 410, a first display 420, a first optical system 430, and a first window 440. Additionally, the hand-held electronic device 400 also comprises a capturing module.

The image processor 410 may provide a first image or image data of the first image. The first image may be, for example, a picture, a video image, or a combination of a text and a picture. The first display 420 may display the first image provided by the image processor 410 or according to the image data provided by the image processor 410. As shown in FIG. 4, in this embodiment, the first display 420 is a micro-display disposed inside the hand-held electronic device 400. Since the screen size of the first display 420 is very small, in this embodiment, it is difficult for a user to see the first image displayed by the first display 420 through human eyes.

The first optical system 430 may receive light emitted from the first display 420 and change the light path for the light emitted from the first display 420 to form a first magnified virtual image. The first optical system 430 has a positive refractive power.

The first window 440 is disposed on a first external surface of the hand-held electronic device, to enable the viewer to see the first magnified virtual image through the first optical system 430. As shown in FIG. 4, the size of the first window 440 may correspond to the size of the human eye.

The capturing module comprises a first optical component 451 and a capturing component 453. As shown in FIG. 4, the first optical component 451 is disposed correspondingly to the first window 440. The first surface of the first optical component 451 (such as the inclining surface of the first optical component 451 shown in FIG. 4) can transmit light irradiated in a first direction, to allow the light path of which is changed by the first optical system to pass the first optical component, and the first surface of the first optical component 451 can reflect light irradiated in a second direction. As shown by the solid arrow in FIG. 4, the first surface of the first optical component 451 can transmit the light the light path of which is changed by the first optical system, and reflect the light incident from the first window 440 to the capturing component 453, as shown by the dotted arrow in FIG. 4. Thereby, the first optical component 451 transfers the eye image signal of the viewer, i.e., the light signal, to the capturing component 453, when the viewer comes close to the first external surface of the hand-held electronic device 400. Then, the capturing component 453 may capture the eye image based on the eye image signal transferred by the first optical component 451.

In the example shown in FIG. 4, the first window and the capturing components in the capturing module are not necessary to be disposed correspondingly. Thereby, it does not need to increase the thickness of the hand-held electronic device, and the location of the capturing module in the hand-held electronic device may be determined more flexible.

Referring back to FIG. 3, the recognizing module 360 may perform image recognition based on the eye image captured by the capturing module 350. Then, the controller 370 may generate a control instruction based on the recognition result, and transmit the control instruction to the image processor 310.

When the viewer comes close to the first external surface of the hand-held electronic device to see the first magnified virtual image, it is not convenient for the viewer to perform input operations on the input modules such as the touch screen, the keys, etc., with an operator, such as a finger. For example, when the first display is playing a video image and the viewer wishes to perform a fast forward or backward operation on the video currently in play, he or she may need to move the eye away from the adjacency of the first window, to determine the location of the corresponding operation key and click it thereon.

With the hand-held electronic device provided in the embodiment of the present disclosure, the eye image of the viewer may be captured when the viewer comes close to the first external surface of the hand-held electronic device to see the first magnified virtual image. Thereby, the image processor may be controlled according to the eye image of the viewer, without the user moving the eye away from the adjacency of the first window.

According to another example of the present disclosure, the eye image captured by the capturing module 350 may comprise an iris image. Then, the recognizing module 360 may perform an iris recognition based on the iris image to generate the recognition result. Optionally, when the recognition results represents that the iris image matches with iris information stored in advance, the controller 370 generates a first control instruction to switch the hand-held electronic device to a first processing state. When the recognition results represents that the iris image does not match with the iris information stored in advance, the controller 370 generates a second control instruction to switch the hand-held electronic device to a second processing state.

According to an example of the present disclosure, the image processor 310 may be allowed to provide the first image or the image data to the first display 320 in the first processing state. The image processor 310 may be forbidden to provide the first image or the image data to the first display 320 in the second processing state. That is, only when the iris image of the current viewer captured by the capturing module 350 matches with the iris information stored in advance, the controller 370 allows the image processor 310 to provide the first image to the first display 320. Thereby, the security is enhanced and the viewable content stored in the hand-held electronic device is prevented from being seen by other people.

In addition, according to another example of the present disclosure, an eye state parameter may be obtained by the recognizing module 360 based on the eye image captured by the capturing module 350. The controller 370 may generate the control instruction based on the eye state parameter and transmit the control instruction to the image processor 310, to control the first image provided by the image processor 310.

For example, the eye state parameter may be an eyeball motion parameter indicating the direction of the eyeball in which it moves. Additionally, the eye state parameter may indicate the state of opening/closing of the eye or the blinking action of the eye. As described above, the controller 370 may generate the control instruction based on the eye state parameter to control the first image or the image data provided by the image processor 310. For example, when the eye state parameter indicates that the eyeball of the viewer moves to the right, the controller 370 may generate a fast forward control instruction, and the image processor 310 may perform a fast forward operation on the video image currently in play based on the fast forward instruction. When the eye state parameter indicates that the eyeball of the viewer moves to the left, the controller 370 may generate a fast backward control instruction, and the image processor 310 may perform a fast backward operation on the video image currently in play based on the fast backward instruction. Additionally, when the eye state parameter indicates a blinking of the viewer, the controller 370 may generate a stop control instruction, and the image processor 310 may stop the video image currently being played according to the stop control instruction.

Moreover, for convenience of the user to see the magnified first image by both eyes at the same time, the hand-held electronic device, according to the present disclosure, may also comprise a second display, a second optical system, and a second view. In particular, the second display may display the first image. The second optical system may receive light emitted from the second display and change the light path conversion of the light to form a second magnified virtual image, wherein a length of the light path between the second optical system and the second display is shorter than the focus of the second optical system. The second window is disposed on the first external surface of the hand-held electronic device to allow the viewer to see the second magnified virtual image when coming close to the first external surface. The capturing module may comprise capturing components disposed correspondingly to the first window and the second window respectively, to capture the eye image of both the left eye and the right eye of the viewer. The recognizing module may perform an image recognition on the eye images of both the left eye and the right eye captured by the capturing module and generate a recognition result. The controller may generate a control instruction according to the recognition result of the left eye and the right eye of the viewer, and transmit the control instruction to the image processor, to enrich the control instruction set which may be performed by the viewer with his/her eyes.

In addition, the first window and the second window may be disposed according to the distance between both eyes of the viewer. Alternatively, the hand-held electronic device may further comprise a second adjusting component to adjust the first optical system, and/or the second optical system according to the distance between both eyes of the viewer. For example, the position of the first optical system may be fixed, and the second optical system may be adjusted according to the distance between both eyes of the viewer and vice versa.

Alternatively, the positions of the first optical system and the second optical system may be adjusted by the second adjusting component.

Figure 5:
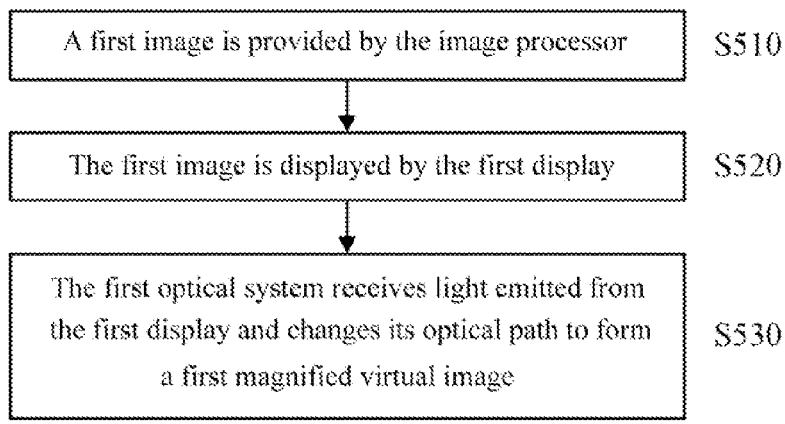
FIG. 5 is a flowchart showing a display method according to an embodiment of the present disclosure.

Next, a display method according to an embodiment of the present disclosure will be described with reference to FIG. 5. FIG. 5 is a flowchart showing the display method 500 according to an embodiment of the present disclosure. The display method 500 is applied to a hand-held electronic device. The individual steps of the display method 500 may be realized by the corresponding modules in the hand-held electronic device shown in FIG. 1, and will not be described here in detail for briefness.

As shown in FIG. 5, in step S510, a first image or image data of the first image is provided by the image processor. The first image may be, for example, a picture, a video image, or a combination of a text and a picture. The image processor may be a central image processing unit (for example, CPU) of the hand-held electronic device, or alternatively, may be a separate image processor physically or logically.

In step S520, the first image is displayed by the first display. According to one example of the disclosure, the first display may be a micro-display, which has a smaller screen size than that of the existing hand-held device. Additionally, according to another embodiment of the disclosure, the first display has a relatively high resolution. Specifically, the resolution of the screen of the first display may be higher than that of the existing hand-held device. For example, the first display may employ a display screen meeting the high definition or the full high definition standard. Since the screen size of the first display is very small, in the example of the disclosure, it is difficult for the user to see the first image displayed by the first display clearly through human eyes.

In step S530, the first optical system receives light emitted from the first display and changes the light path of the light to form a first magnified virtual image, wherein the length of the light path between the first optical system and the first display is shorter than the focus of first optical system. That is to say, the first optical system has a positive refractive power. A magnification of the first optical system may be set in advance. Alternatively, the first optical system may comprise a first adjusting component to adjust the magnification of the first optical system. By a first window disposed on a first external surface of the hand-held electronic device, the viewer may see the magnified virtual image of the first image via the first optical system.

With the display method provided by the above embodiment of the disclosure, the watchable image size is not limited to the screen size of the hand-held device itself, such that the user may see a display image with a relatively large size through the hand-held device while the portability of the hand-held device is kept. Additionally, compared with a micro-projector, the hand-held device, according to this embodiment, has a considerably low consumption and is not limited by ambient light. The hand-held device, according to the embodiment of the disclosure, may be used to watch a video or a picture both in outdoors with strong light and indoors with weak light.

Additionally, as described above, since the viewer can see the first magnified virtual image through the first optical system only when close to the first external surface, such that the content seen by the user is prevented from being seen by others to improve the privacy.

Figure 6:
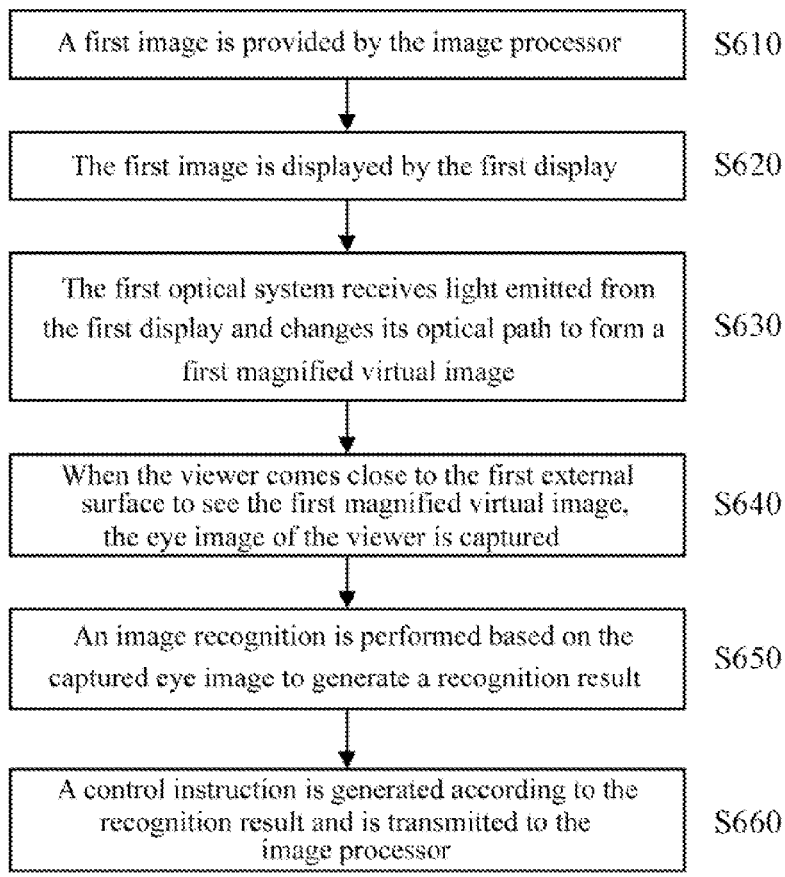
FIG. 6 is a flowchart showing a display method according to another embodiment of the present disclosure.

Hereinafter, the display method according to another embodiment of the present disclosure will be described with reference to FIG. 6. FIG. 6 is a flowchart showing the display method 600 according to another embodiment of the present disclosure. The individual steps of the display method 600 may be realized by the corresponding modules in the hand-held electronic device shown in FIG. 3, and will not be described here in detail for briefness.

Similar to steps S510-S530 of the display method 500 shown in FIG. 5, in step S610, a first image or image data of the first image is provided by the image processor. The first image may be, for example, a picture, a video image, or a combination of a text and a picture. The image processor may be a central image processing unit (for example, CPU) of the hand-held electronic device, or alternatively, may be a separate image processor physically or logically. In step S620, the first image is displayed by the first display. According to one example of the disclosure, the first display may be a micro-display unit, which has a smaller screen size than that of the existing hand-held device. Additionally, according to another embodiment of the disclosure, the first display has a relatively high resolution. Specifically, the resolution of the screen of the first display may be higher than that of the existing hand-held device. For example, the first display may employ a display screen meeting the high definition or the full high definition standard. Since the screen size of the first display is very small, in the example of the disclosure, it is difficult for the user to see the first image displayed by the first display clearly through human eyes. Then, in step S630, the first optical system receives light emitted from the first display and changes the light path of the light to form a first magnified virtual image, wherein the length of the light path between the first optical system and the first display is shorter than the focus of the first optical system. That is to say, the first optical system has a positive refractive power. A magnification of first optical system may be set in advance. Alternatively, the first optical system may comprise a first adjusting component to adjust the magnification of the first optical system. By a first window disposed on a first external surface of the hand-held electronic device, the viewer may see the magnified virtual image of the first image via the first optical system.

In addition, the method shown in FIG. 6 further comprises steps S640-S660. In step S640, when the viewer comes close to the first external surface of the hand-held electronic device to see the first magnified virtual image, the eye image of the viewer is captured. In step S650, an image recognition is performed based on the captured eye image to generate a recognition result. Then, in step S660, a control instruction is generated according to the recognition result and is transmitted to the image processor.

When the viewer comes close to the first external surface of the hand-held electronic device to see the first magnified virtual image, it is not easy for the viewer to perform input operations on the input modules such as the touch screen, the keys, etc., with an operator, such as a finger. For example, when the first display is playing a video image and the viewer wishes to perform a fast forward or backward operation on the video currently in play, he or she may need to move the eye away from the adjacency of the first window, to determine the location of the corresponding operation key and click it thereon.

With the display method provided in the embodiment of the present disclosure, the eye image of the viewer may be captured when the viewer comes close to the first external surface of the hand-held electronic device to see the first magnified virtual image. Thereby, the image processor may be controlled according to the eye image of the viewer, without the user moving the eye away from the adjacency of the first window.

According to an example of the present disclosure, in step S640, the iris image of the viewer may be captured when the viewer comes close to the first external surface to see the first magnified virtual image. In step S650, the iris recognition may be performed based on the iris image to generate the recognition result. Optionally, when the recognition results represents that the iris image matches with the iris information stored in advance, a first control instruction is generated in step S660, to switch the hand-held electronic device to a first processing state. When the recognition results represents that the iris image does not match with the iris information stored in advance, a second control instruction is generated in step S660, to switch the hand-held electronic device to a second processing state.

According to an example of the present disclosure, the image processor may be allowed to provide the first image or the image data of the first image to the first display in the first processing state. The image processor may be forbidden to provide the first image or the image data of the first image to the first display in the second processing state. That is, only when the captured iris image of the current viewer matches with the iris information stored in advance, the image processor is allowed to provide the first image or the image data of the first image to the first display in step S610. Thereby, the security is enhanced and the viewable content stored in the hand-held electronic device is prevented from being seen by other people.

In addition, according to another example of the present disclosure, in step S650, an eye state parameter may be obtained based on the eye image captured in step S640. In step S660, the control instruction may be generated based on the eye state parameter and transmitted to the image processor to control the first image provided by the image processor.

For example, the eye state parameter may be an eyeball motion parameter indicating the direction of the eyeball in which it moves. Additionally, the eye state parameter may indicate the state of opening/closing of the eye or the blinking action of the eye. As described above, in step S660, the control instruction may be generated based on the eye state parameter to control the first image or the image data provided by the image processor. For example, when the eye state parameter indicates that the eyeball of the viewer moves to the right, a fast forward control instruction may be generated in step S660, and the image processor may perform a fast forward operation on the video image currently being played based on the fast forward instruction. When the eye state parameter indicates that the eyeball of the viewer moves to the left, a fast backward control instruction may be generated in step S660, and the image processor may perform a fast backward operation on the video image currently being played based on the fast backward instruction. Additionally, when the eye state parameter indicates a blinking of the viewer, a stop control instruction may be generated in step S660, and the image processor may stop the video image currently being played according to the stop control instruction.

Figure 7:
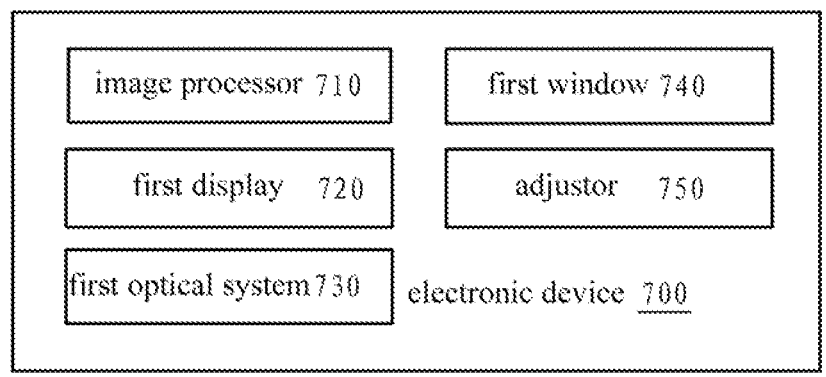
FIG. 7 is an exemplary block diagram of a hand-held electronic device according to another embodiment of the present disclosure.

FIG. 7 is a schematic diagram showing a hand-held electronic device 700 according to another embodiment of the disclosure. Similar to the hand-held electronic device 100 shown in FIG. 1, a hand-held electronic device 700 comprises an image processor 710, a first display 720, a first optical system 730, and a first window 740. Additionally, the hand-held electronic device 700 further comprises an adjustor 750.

The image processor 710 may provide a first image or image data of the first image. The first image may be, for example, a picture, a video image, or a combination of a text and a picture, and the like. The first display 720 may display the first image provided by the image processor 710 or according to the image data provided by the image processor 710. As shown in FIG. 7, in this embodiment, the first display 720 is a micro-display disposed inside the hand-held electronic device 700. Since the screen size of the first display 720 is very small, in this embodiment, it is difficult for the user to see the first image displayed by the first display 720 clearly through human eyes.

The first optical system 730 may receive light emitted from the first display 720 and change the light path for the light emitted from the first display to form a first magnified virtual image. That is, the first optical system 730 has a positive refractive power. The first window 740 enables the viewer to see the first magnified virtual image through the first optical system 330 when the viewer comes close to the first window.

The adjustor 750 may adjust the first display 720, the first optical system 730 and/or the first window 740, based on the first position of the eye watching the first magnified virtual image. For example, the adjustor 750 may adjust the direction, in which the first display 720 emits light, based on the first position of the eye watching the first magnified virtual image. When the adjustor 750 adjusts the direction in which the first display 720 emits light, based on the first position of the eye watching the first magnified virtual image, the adjustor 750 may also adjust the direction, in which the optical axis of the first optical system 730 locates. Additionally, the adjustor 750 may adjust the setting position of the first window 740 based on the first position of the eye watching the first magnified virtual image.

According to an example of the present disclosure, the adjustor 750 may comprise a knob section, and the viewer may adjust the first display 720, the first optical system 730 and/or the first window 740 manually, based on the first position of the eye watching the first magnified virtual image. Alternatively, according to another embodiment of the present disclosure, the hand-held electronic device 700 may comprise a detector. The detector may detect the first position of the eye watching the first magnified virtual image, when the viewer comes close to the first window, to enable the adjustor 750 to adjust the first display 720, the first optical system 730, and/or the first window 740 automatically, based on the first location detected by the detector.

For example, the detector may comprise an image capturing module and a recognition module. The image capturing module may capture the face image of the user when the viewer comes close to the first window. The recognizing module may perform the image recognition on the face image captured by the capturing module to determine the first position of the eye watching the first magnified virtual image. Additionally, the detector may comprise an infrared ray emission module. The infrared ray emission module may emit infrared ray to the viewer. The recognition module may determine the first position of the eye watching the first magnified virtual image, based on the reflective infrared image from the viewer or by combining the reflective infrared image from the viewer with the face image obtained by the image capturing module. The time for detecting the first position by the detection module may be shorten by means of the reflective infrared image.

With the hand-held electronic device provided in the embodiment of the present disclosure, the first display 720, the first optical system 730, and/or the first window 740 may be adjusted based on the position of the eye of the viewer, for convenience of the user watching the first magnified virtual image, and thereby improving the watching experience of the user.

Moreover, in another example of the present disclosure, for convenience of the user to see the magnified first image by both eyes at the same time, the hand-held electronic device 700 shown in FIG. 7 may also comprise a second optical system and a second window. Similar to the first optical system and the first window, the second optical system may receive light emitted from the first display and change the light path of the light to form a second magnified virtual image, wherein the length of the light path between the second optical system and the first display is shorter than the focus of second optical system. The second window allows the viewer to see the second magnified virtual image through the second optical system when the viewer comes close to the second window.

Since the distance between both eyes of each user is different, when the individual components of the hand-held electronic device is fixedly disposed, some viewers may not be able to see the second magnified virtual image clearly and completely while watching the first magnified virtual image. In the hand-held electronic device provided in the embodiment of the present disclosure, the position of the eye watching the second magnified virtual image may be fixed, and the first display 720, the first optical system 730 and/or the first window 740 may be adjusted based on the position of the other eye of the viewer watching the first magnified virtual image, so that the viewer may see the first magnified virtual image and the second magnified virtual image at the same time.

Figure 8:
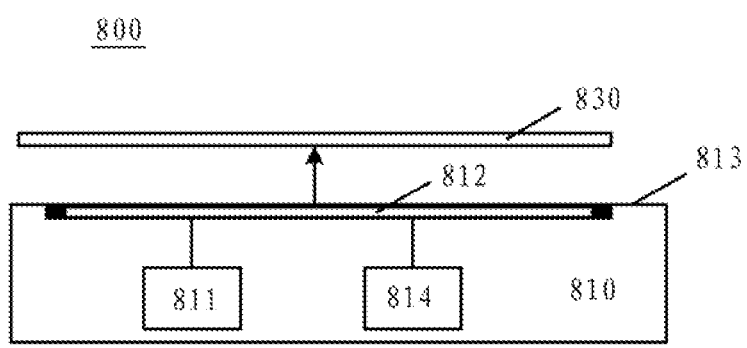
FIG. 8 is a schematic view showing a basic construction of a hand-held electronic device according to an embodiment of the present disclosure.

Hereinafter, an example of the hand-held electronic device 700 shown in FIG. 7 will be described with reference to FIGS. 8, 9A, and 9B. FIG. 8 is a schematic diagram showing the basic construction of the hand-held electronic device according to an embodiment of the present disclosure. As shown in FIG. 8, the hand-held electronic device 800 comprises a main body section 810 and an attachment section 830. An image processor 810 is disposed in the main body section 810. Similar to the display of the current smart phone, the multimedia player, and the tablet, the first display 820 is disposed on the first surface 813 of the main body section 810, so that it is not necessary to dispose a display for displaying the first image in the hand-held electronic device additionally.

According to an example of the present disclosure, the resolution of the screen of the first display 812 may be adjusted. For example, the first display 812 may have a low resolution display mode and a high resolution display mode. In the low resolution display mode, the first display 812 sets the resolution of its display screen to be low to allow the viewer to see the image displayed on the screen of the first display 812 directly. That is, it is not necessary to change the light path by the optical system, and the viewer can see the image displayed on the screen of the first display 812 directly. In the high resolution display mode, the first display 812 sets the resolution of its display screen to be high, and display the first image provided by the image processor.

Additionally, to save power and reduce the production cost, only a part of the screen of the first display 812 may be set to display with a higher resolution or display with a lower resolution, while the other part is set to display only with a lower resolution. In the high resolution display mode, the first display 812 may set the resolution of the whole screen to be low to ensure that the resolution of the picture is uniform. In addition, in the high resolution display mode, the first display 812 may turn off the part that does not display with a higher resolution, which will be described later in detail.

The first optical system and the first window (not shown) are disposed in the attachment section 830. For example, as shown in FIG. 8, the first optical system may comprise a lens assembly, the area that corresponds to that of the screen of the first display 812, and the viewer may see the first magnified virtual image through the first window set in correspondence with the first optical system. Alternatively, the first optical system may comprise a lens assembly, the area that is smaller than that of the first display 812, and the first optical system may comprise a light guiding component to reflect the light passing the lens assembly to the first window. For example, the light guiding component may comprise multiple light reflective components disposed in the attachment section 830 in parallel with each other to reflect the light passing the lens assembly to the first window, so that the viewer may see the first magnified virtual image through the first window.

When the first magnified virtual image is watched, the attachment section 830 may cover the first display. According to an example of the present disclosure, the attachment section 830 may be separate from the main body section 810. When the first magnified virtual image is watched, the attachment section 830 may be placed on the first display.

Alternatively, according to another example of the present disclosure, the hand-held electronic device 800 may comprise a pivot that can rotate about a center of the pivot to connect the main body section 810 with the attachment section 830. In particular, the attachment section 830' may be connected with the pivot, so that the main body section 810 can rotate relative to the center of pivot. When the first magnified virtual image is to be watched, the attachment section 830 may be rotated to cover the first display 812.

In addition, according to another example of the present disclosure, the attachment section 830 may be connected with the main body section 810 and may move along a sliding track with respect to the main body section 810. When the first magnified virtual image is to be watched, the attachment section 830 may be slid to cover the first display 812.

Additionally, as shown in FIG. 8, the adjustor 814 is disposed within the main body section 810. The adjustor 814 may adjust the first display 812 covered with the first optical system and the first window, according to the first position of the eye watching the first magnified virtual image. The adjustment of the first display 812 by the adjustor 814 will be described in the following with reference to FIGS. 9A and 9B. FIGS. 9A and 9B are schematic diagrams showing the adjustment of the first display 812 by the adjustor 814.

As shown in FIG. 9A, the hatched part in the display screen of the first display 812 is the high resolution display region, which may display with a higher resolution or a lower resolution. In the example shown in FIG. 9A, in the original state, the first display 812 may set the part shown by the solid box in the high resolution display region as the first part 815 according to the predetermined setting, and display the first image provided by the image processor.

As shown in FIG. 9B, when the first magnified virtual image is to be watched, the attachment section 830 may be placed on the first display 812. The first optical system (not shown) disposed in the attachment section 830 receives light from the first part 815, and changes the light path of the light emitted from the first part 815, to form the first magnified virtual image, wherein the length of the light path between the first optical system and the first part is shorter than the focus of the first optical system.

The adjustor 814 adjusts the first setting position of the first part 815 in the display screen of the first display, according to the first position of the eye watching the first magnified virtual image as shown in FIG. 9B. As shown in FIG. 9A, the adjustor 814 sets the part shown in the dotted box of the high resolution display region as the first part 815' according to the first position of the eye shown in FIG. 9B, and display the first image provided by the image processor in the adjusted first section 815', for convenience of the user watching the first magnified virtual image. Additionally, to reduce the power consumption, the first display 812 may turn off the display region in the other part than the first part when displaying the first image.

In the hand-held electronic device according to the present example, the first optical system and the first window may be set according to the size of the whole display screen of the first display. Thereby, when the attachment section locates on top of the first display, it only needs to adjust the part displaying the first image in the first display covered with the first optical system and the first window, according to the position of the eye watching the first magnified virtual image, and it does not need to adjust the first optical system and the first window.

In addition, according to another example of the present disclosure, for convenience of the user watching the magnified image through both eyes at the same time, in the hand-held electronic device 800 shown in FIG. 8, the first display may display the first image provided by the image processor by its second part of the display screen. Similar to the first part, the adjustor adjusts the second setting position of the first display in the display screen, according to the second position of the eye watching the second magnified virtual image. In addition, the hand-held electronic device 800 may also comprise a second optical system and a second window corresponding to the second part. The second optical system may receive light emitted from the second part, and change the light path of the light emitted from the second part to form the second magnified virtual image. The length of the light path between the second optical system and the second part is shorter than the focus of the second optical system. The second window allows the viewer to see the second magnified virtual image through the second optical system when the viewer comes close to the second window.

In the case where the first optical system and the first window are set according to the size of the whole display screen of the first display, the second optical system and the first optical system may be realized by the same component. Similarly, the second window and the first window may be realized by the same component.

In the following, another example of the hand-held electronic device 700 shown in FIG. 7 will be described with reference to FIG. 10. FIG. 10 is a schematic diagram showing the basic construction of the hand-held electronic device according to another embodiment of the present disclosure. As shown in FIG. 10, the image processor 1010, the first display 1020 and the first optical system 1030 are disposed inside of the hand-held electronic device 1000. The first window 1040 is disposed on the second surface 1050 of the hand-held electronic device 1000. In the example shown in FIG. 10, the first display 1020, the first optical system 1030, and the first window 1040 are disposed correspondingly along the optical axis of the first optical system. In the present embodiment, the size of the first window 1040 corresponds to the size of the human eye.

The adjustor (not shown) may adjust the first window, according to the first position of the eye watching the first magnified virtual image, to adjust the third setting position of the first window on the first external surface. In addition, the adjustor may adjust the emission direction of the first display, and the direction in which the optical axis of the first optical system locates according to the adjusted third setting position of the first window, for convenience of the user watching the first magnified virtual image. In the present example, the adjustor may comprise adjusting components corresponding to the first display 1020, the first optical system 1030 and the first window 1040 respectively. Alternatively, the adjustment to the first display 1020, the first optical system 1030, and the first window 1040 may be done by the same adjusting component.

In addition, according to another example of the present disclosure, for convenience of the user watching the magnified first image through both eyes at the same time, the hand-held electronic device 1000 shown in FIG. 10 may comprise a second display, a second optical system and a second window. The second display may display the first image provided by the image processor. The second optical system may receive light emitted from the second display, and change the light path of the light from the second display to form the second magnified virtual image. The length of the light path between the second optical system and the second display is shorter than the focus of the second optical system. The second window allows the viewer to see the second magnified virtual image through the second optical system when the viewer comes close to the second window.

The second display and the second optical system are disposed within the hand-held electronic device. Similarly to the first window, the second window may be disposed on the second surface of the hand-held electronic device. The second display, the second optical system and the second window are disposed correspondingly along the optical axis of the second optical system.

The adjustor may adjust the fourth setting position of the second window on the first external surface, according to the second position of the eye watching the second magnified virtual image, and adjust the emission direction of the second display and the direction in which the optical axis of the second optical system locates, according to the adjusted fourth setting position of the second window.

Figure 11:
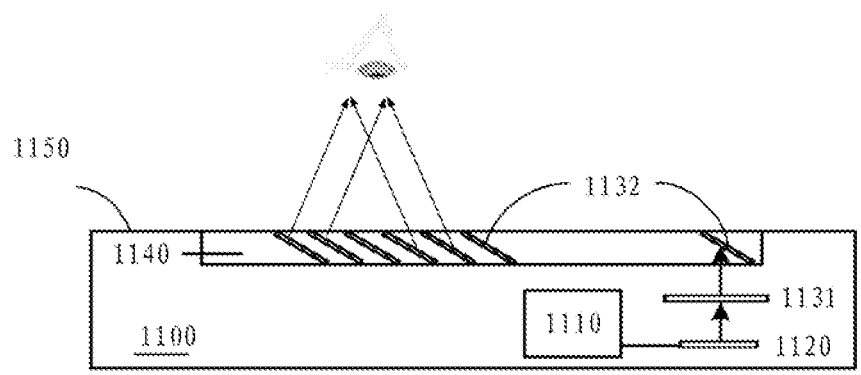
FIG. 11 is a schematic view showing a basic construction of a hand-held electronic device according to another embodiment of the present disclosure.

In the following, another example of the hand-held electronic device 700 shown in FIG. 7 will be described with reference to FIG. 11. FIG. 11 is a schematic diagram showing the basic construction of the hand-held electronic device according to another embodiment of the present disclosure. As shown in FIG. 11, the image processor 1110 and the first display 1120 are disposed within the hand-held electronic device 1100. The first window 1140 is disposed on the third surface 1150 of the hand-held electronic device 1100. For example, the first window 1140 may be a transparent protective component on the third surface 1150. The adjustor (not shown) may adjust the first optical system of the hand-held electronic device 1100 according to the first position of the eye watching the first magnified virtual image.

In particular, in the example shown in FIG. 11, the first optical system may comprise a first lens assembly 1131 and a first light guiding component 1132. The first lens assembly 1131 may receive the light emitted from the first display 1120, and change the light path of the light emitted from the first display 1120 to form a first magnified virtual image. The first light guiding component 1132 may reflect the light passing the first lens assembly through the first window to the viewer. As shown in FIG. 11, the first light guiding component 1132 may be disposed in the transparent protective component. The adjustor may adjust the light guiding direction and the setting position etc. of the first light guiding component 1132 according to the first position of the eye watching the first magnified virtual image. According to an example of the present disclosure, the first light guiding component 1132 may comprise multiple light reflective components in parallel with each other to reflect the light passing the first lens assembly 1131 to the first window, so that the viewer may see the first magnified virtual image through the first window. Optionally, the light reflective component may have a transmitting state and a reflecting state. The part of the first light guiding component 1132 corresponding to the first position may be set in the reflecting state, and the other part may be set in the transmitting state.

For example, the light reflective component may be a light film such as a PDLC (Polymer Dispersed Liquid Crystal) thin film. In particular, the PDLC thin film comprises liquid crystal and polymer. When a voltage is applied to the PDLC thin film, the optical axis of the liquid crystal particle is perpendicular to the surface of the PDLC thin film, that is, consistent with the electric field. The light reflective index of the liquid crystal particle matches with the reflective index of the polymer essentially, and there is no obvious interface, which forms a substantially uniform medium, so that the incident light will not be scattered, and the PDLC thin film appears transparently. When there is no voltage applied to the PDLC thin film, there is no regular electric field between the PDLC thin films. The optical axis of the liquid crystal particle is taken at random and appears in an out-of-order state. The reflective index n1 of the liquid crystal particle does not match with the reflective index n2 of the polymer, so that the incident light is scattered largely, and the PDLC thin film appears a non-transparent state or a translucent state. The transmittance of the light reflective component may be any digital value between 0% and 100%. In addition, as described above, the inclining angle of the light reflective component disposed in the transparent protective component may be adjusted according to the first position of the eye, to change the reflective direction thereof, so that the user may see the first magnified virtual image clearly.

In the hand-held electronic device according to the present example, the transparent protective component as the first window may have a relatively large area, to make it easy to align the eye with a part of the transparent protective component by the user, without any adjustment to the transparent protective component. Thereby, the adjustor only needs to adjust the light guiding component according to the first position of the eye watching the first magnified virtual image, and does not need to adjust the first display and the first window.

In addition, according to another example of the present disclosure, for convenience of the user watching the magnified first image through both eyes at the same time, the hand-held electronic device 1100 shown in FIG. 11 may further comprise a second display and a second optical system. The second display may display the first image provided by the image processor. The second optical system may receive light transmitted from the second display, and change the light path of the light emitted from the second display to form a second magnified virtual image. The length of the light path between the second optical system and the second display is shorter than the focus of the second optical system. As described above, the transparent protective component may have a relatively large area as the first window, to allow the viewer to see the second magnified virtual image through the second optical system while watching the first magnified virtual image, when the viewer comes close to the first window.

Similarly to the first optical system, the second optical system comprises a second lens assembly and a second light guiding component. The second lens assembly may receive the light emitted from the second display and change the light path of the light emitted from the second display to form the second magnified virtual image. The second light guiding component may be disposed in the transparent protective component to reflect the light passing the second light guiding component to the viewer through the first window. The adjustor may also adjust the second light guiding component according to the second position of the eye watching the second magnified virtual image.

In addition, according to another example of the present disclosure, the hand-held electronic device shown in FIG. 11 may also comprise a third display for displaying a second image. The display region of the third display may be larger than that of the first display, and the third display allows the viewer to see the second image directly. That is, it is not necessary to change the light path of the image displayed by the third display through the optical system, and the viewer may see the second image displayed by the third display directly. The transparent protective component may cover on top of the third display and be disposed in lamination with the third display.

Additionally, according to another example of the present disclosure, the hand-held electronic device 1100 may also comprise a pivot, a first casing, and a second casing. The pivot may rotate about a center of the pivot. The first casing is connected to the pivot so that the first casing may rotate about the center of the pivot. The transparent protective component is disposed on the third surface of the first casing, which may be transparent. The second casing is also connected to the pivot, so that the second casing may rotate about the center of the pivot. When the first magnified virtual image is to be watched, the first casing may be rotated away from the second casing, so that the viewer may see the real world when watching the first magnified virtual image, to avoid the occurrence of accidents, such as slipping, running into an obstacle, etc.

In addition, according to another example of the present disclosure, the hand-held electronic device 1100 may comprise a first casing and a second casing connected with each other by a slide track. In particular, the first casing may be connected with the second casing of the hand-held electronic device by the slide track and is movable along the slide track with respect to the second casing. The transparent protective component is disposed on the third surface of the first casing, which may also be transparent. The second casing is connected with the first casing of the hand-held electronic device by the slide track, and is movable along the slide track with respect to the first casing. When the first magnified virtual image is to be watched, the first casing may be slid away from the second casing, so that the viewer may see the real world when watching the first magnified virtual image to avoid the occurrence of accidents, such as slipping, running into an obstacle, etc.

In addition, according to another example of the present disclosure, the method shown in FIG. 5 may also comprise adjusting the first display and/or the first optical system according to the first position of the eye watching the first magnified virtual image. For example, the emission direction of the first display may be adjusted according to the first position of the eye watching the first magnified virtual image, and the first image may be displayed. When the emission direction of the first display is adjusted according to the first position of the eye watching the first magnified virtual image, the direction in which the optical axis of the first optical system locates may be adjusted accordingly. In addition, the setting position of the first window may be adjusted according to the first position of the eye watching the first magnified virtual image.

According to an example of the present disclosure, the first display and/or the first optical system may be adjusted manually by a component such as a knob, etc., according to the first position of the eye watching the first magnified virtual image. Alternatively, the method in FIG. 5 may comprise detecting the first position of the eye watching the first magnified virtual image when the viewer comes close to the first window, before adjusting the first display and/or the first optical system, so that the first display and/or the first optical system may be adjusted automatically according to the first position detected by the detector.

For example, the face image of the user may be acquired when the viewer comes close to the first window. Then, the image recognition is performed on the face image obtained by the acquiring module to determine the first position of the eye watching the first magnified virtual image. In addition, the near infrared light may be emitted to the viewer through an infrared light emission module. The first position of the eye watching the first magnified virtual image may be determined according to the reflective infrared image from the viewer or by combining the reflective infrared image from the viewer with the face image. The time for detecting the first position may be shorten by means of the reflective infrared image.

With the display method provided in the embodiment of the present disclosure, the first display and/or the first optical system may be adjusted according to the position of the eye of the viewer, to facilitate the user to see the first magnified virtual image and improve the user's watching experience.

Figure 12:
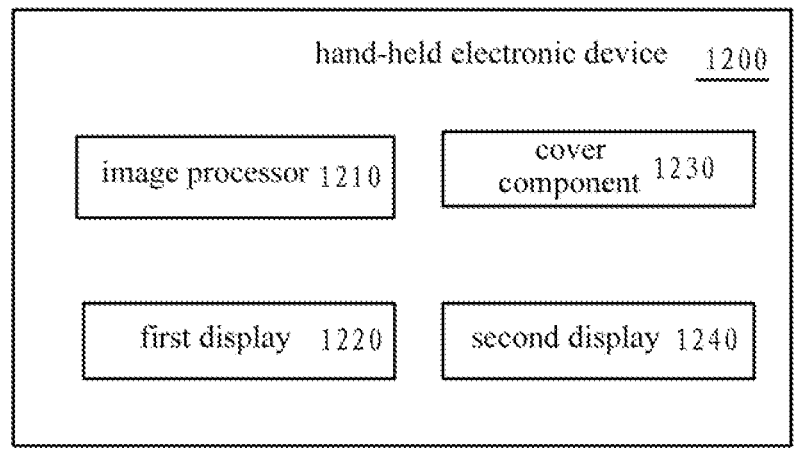
FIG. 12 is an exemplary block diagram of a hand-held electronic device according to another embodiment of the present disclosure.

FIG. 12 is a schematic diagram showing a hand-held electronic device 1200 according to an embodiment of the present disclosure. As shown in FIG. 12, the hand-held electronic device 1200 comprises an image processor 1210, a first display 1220, a cover component 1230, and a second display 1240.

The image processor 1210 may provide a first image or image data of the first image. The first image may be, for example, a picture, a video image, a text, or a combination of a picture and a text, or the like. The image processor 1210 may be a central processing unit (for example CPU) of the hand-held electronic device, or alternatively, may also be a separate image processor physically or logically.

The first display 1220 is disposed on the first surface of the hand-held electronic device. When the hand-held electronic device is in the first state, the first display 1220 displays the first image according to the image data provided by the image processor. In the first state, the first display 1220 allows the viewer to see the image directly. That is, the viewer may see the first image provided by the first display 1220 directly without a light path change to the image displayed by the second display through the optical system.

In addition, in the first state, the cover component 1230 covers the first display to protect the first display. According to an example of the present disclosure, the cover component has a predetermined transmittance. Thereby, when the cover component 1230 covers the first display, the viewer may still see the first image displayed in the first display.

When the hand-held electronic device is in the second state, the second display 1240 may display the second image according to the image data provided by the image processor. According to an example of the present disclosure, the second display 1240 may be disposed in the hand-held electronic device 1200. Alternatively, the second display 1240 may also be disposed on the first surface of the hand-held electronic device 1200, which will be described later.

In the second state, the light from the second display 1240 may be received through the first optical system, and on the light path of the light from the second display is changed to form a first magnified virtual image corresponding to the second image. In the second state, the viewer may see the first magnified virtual image through the first optical system when he or she comes close to the first optical system. According to an example of the present disclosure, the first optical system may be constructed to be a component separate from the hand-held electronic device 1200. Alternatively, the hand-held electronic device 1200 may comprise the first optical system. For example, the first optical system and the main body of the hand-held electronic device 1200 may be connected by a connection component such as a pivot, a slide track, etc.

According to an example of the present disclosure, the first optical system comprises at least a lens assembly having a positive reflective power. For example, the lens component may comprise a convex lens. In addition, to reduce and avoid the interference to imaging caused by aberration and dispersion to bring better visual experience to users, the lens assembly may be formed of multiple lenses comprising the convex lens and the concave lens. The lens component formed of multiple lenses has a positive reflective power, that is, is equivalent to a convex lens.

By the hand-held electronic device provided by the above embodiment of the disclosure, the watchable image size is not limited to the screen size of the hand-held device itself, such that the user may see a display image with a relatively big size through the hand-held device while the portability of the hand-held device is kept. Additionally, compared with a micro-projector, the hand-held device according to this embodiment has a considerably low consumption and is not limited by ambient light. The hand-held device according to the embodiment of the disclosure may be used to watch a video or a picture both in outdoors with strong light and indoors with weak light.

Additionally, as described above, since the viewer can see the first magnified virtual image through the first optical system only when close to the first external surface, such that the content watched by the user is prevented from being seen by others so as to improve the privacy.

Additionally, in the hand-held electronic device and the display method according to the embodiment of the present disclosure, it may be switched between the first state of the hand-held electronic device, in which the first image is displayed by the first display (e.g. when the hand-held electronic device is a mobile phone, the first state may be a normal use state of the mobile phone) and a second state of the hand-held electronic device, to control the on and off of the second display. Thereby, when the viewer does not need to see the magnified image, the second display may be turned off to save power.

In the hand-held electronic device shown in FIG. 12, the viewer may switch between the first state and the second state manually. Alternatively, the hand-held electronic device 1200 may comprise a condition determination module and a mode controller. The condition determination module may determine whether the mode switch condition is met. When the condition determination module determines that the mode switch condition is met, the mode controller switches between the first state and the second state automatically.

According to an example of the present disclosure, the mode switch condition may comprise a first mode switch condition and a second mode switch condition. The first mode switch condition is that the distance from the viewer to the first surface of the hand-held electronic device 1200 changes from being larger than the mode switch distance to being smaller than or equal to the mode switch distance. The second mode switch condition is that the distance from the viewer to the first window changes from being smaller than or equal to the mode switch distance to being larger than the mode switch distance. For example, when the condition determination module determines that the first mode switch condition is met, the mode controller switches the hand-held electronic device from the first state to the second state automatically. When the condition determination module determines that the second mode switch condition is met, the mode controller switches the hand-held electronic device from the second state to the first state automatically.

The hand-held electronic device 1200 may further comprise a first detector. The first detector may determine whether the distance from the viewer to the first surface is shorter than the mode switch distance and obtain a detecting result. The condition determination module may determine whether the mode switch condition is met or not according to the detecting result.

Figure 13:
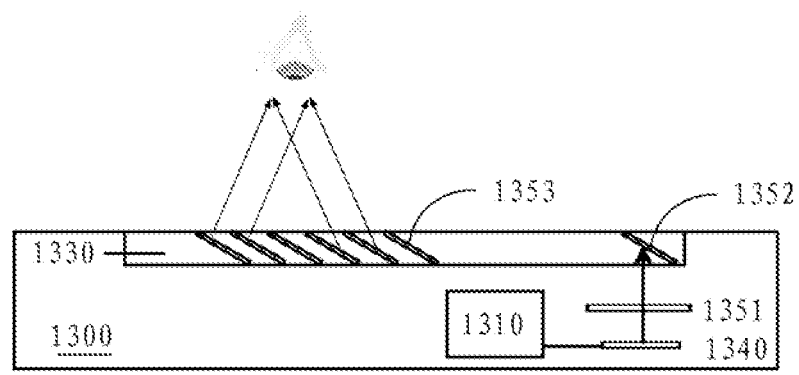
FIG. 13 is a schematic view showing a basic construction of a hand-held electronic device according to another embodiment of the present disclosure.

FIG. 13 is a schematic diagram of the basic construction of the hand-held electronic device 1300 according to another embodiment of the present disclosure. Similar to the hand-held electronic device 1200 shown in FIG. 12, the hand-held electronic device 1300 comprise an image processor 1310, a first display (not shown), a cover component 1330, and a second display 1340. The image processor 1310, the first display, the cover component 1330, and the second display 1340 are similar to the image processor 1210, the first display 1220, the cover component 1230, and the second display 1240 in FIG. 12 respectively, and are not described here to avoid redundancy. As shown in FIG. 13, in the present embodiment, the second display 1340 is disposed in the hand-held electronic device 1300.

According to an example of the present disclosure, the second display 1340 may be a micro-display, the screen size of which is smaller than that of the existing hand-held device. Additionally, according to another embodiment of the disclosure, the second display 1340 has a relatively high resolution. Specifically, the resolution of the screen of the second display 1340 may be higher than that of the existing hand-held device. For example, the second display 1340 may employ a display screen meeting the high definition or the full high definition standard. Since the screen size of second display 1340 is very small, in the example of the disclosure, it is difficult for a user to see the second image displayed by the second display 1340 through human eyes clearly. Additionally, in the case that the hand-held device has a relatively high resolution of screen, the resolution of the screen of second display 1340 may be equal to that of the hand-held device.

In addition, the hand-held electronic device 1300 may comprise a first optical system. The first optical system comprises a lens assembly 1351, a first light guiding component 1352 and a second light guiding component 1353. As shown in FIG. 13, the lens assembly 1351 is disposed in the hand-held electronic device 1300 for receiving the light emitted from the second display 1340 and changing the light path of the light emitted from the second display 1340 to form the first magnified virtual image. The first light guiding component 1352 may transfer the light passing the lens assembly 1351 to the second light guiding component 1353. In the example shown in FIG. 13, the first light guiding component 1352 is a mirror. However, the present disclosure is not limited thereto. For example, the first light guiding component 1352 may also be an optical fiber.

As shown in FIG. 13, the second light guiding component 1353 is disposed in the cover component 1330 on top of the first display. The second light guiding component 1353 comprises multiple light reflective components arranged in parallel with each other, to reflect the light transferred from the first light guiding component 1352 to the side opposite to the first display. Thereby, when the user comes close to the first external surface of the hand-held electronic device 1300 and looks in the direction in which the first display locates, he or she may see the first magnified virtual image.

According to an example of the present disclosure, the light reflective component in the second light guiding component 1353 may be a mirror. Alternatively, the light reflective component may be a transparent mirror device. Thereby, when the viewer faces to the first external surface, the viewer may see the first magnified virtual image of the second image displayed by the second display and see the first image by the first display directly.

In addition, when the user watches the first image by the first display, the second light guiding component may be set in the transmitting mode. When the user watches the second image by the second display, the second light guiding component may be set in the reflecting mode.

Figure 14A:
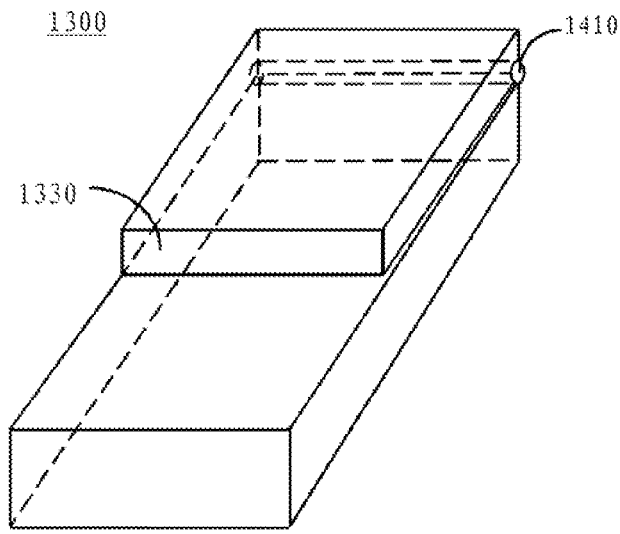
FIGS. 14A and 14B are schematic views showing a hand-held electronic device according to another embodiment of the present disclosure.
Figure 14B:
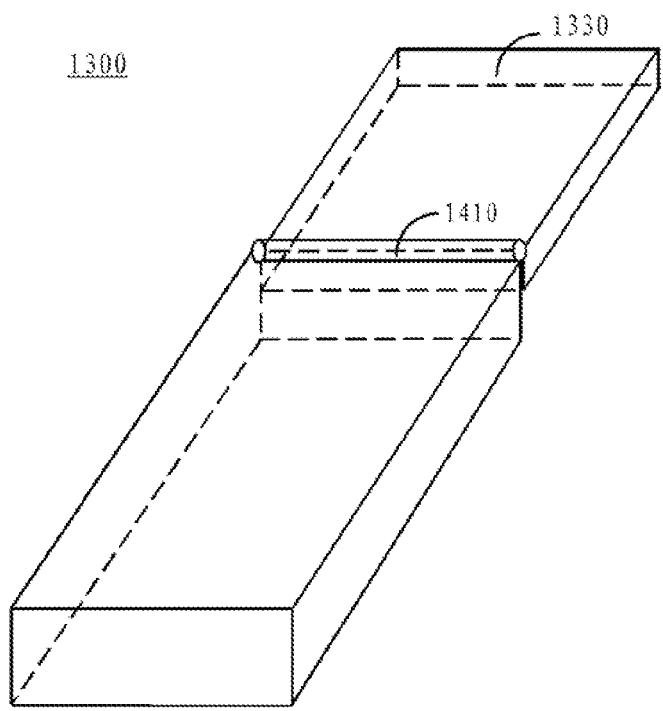

Additionally, according to an example of the present disclosure, in the second state, at least a part of the cover component may be separate from the first display, so that the cover component does not overlap with the position where the viewer watches the first magnified virtual image. FIGS. 14A and 14B are schematic diagrams showing the hand-held electronic device according to another embodiment of the present disclosure. In the example shown in FIGS. 14A and 14B, the hand-held electronic device 1300 may also comprise a pivot. The pivot 1410 may rotate about its center, and may be disposed at the first side of the first surface of the hand-held electronic device 1300. The cover component 1330 is connected to the pivot 1410, so that the cover component 1330 may rotate about the center of the pivot 1410.

In the second state, as shown in FIG. 14B, the user may rotate the cover component 1330 so that it is separate from the second casing of the hand-held electronic device. Since the cover component 1330 has a predetermined transmittance, the real world may be seen when the user watches the first magnified virtual image to prevent the viewer from slipping, breaking into an obstacle, etc.

Figure 15A:
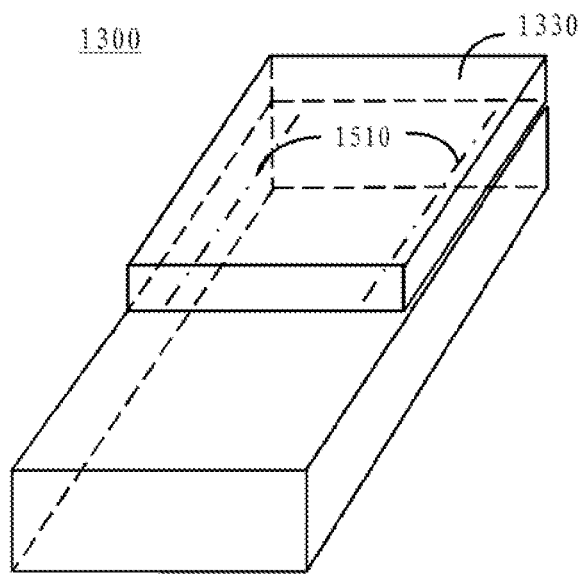
FIGS. 15A and 15B are schematic views showing a hand-held electronic device according to another embodiment of the present disclosure.
Figure 15B:
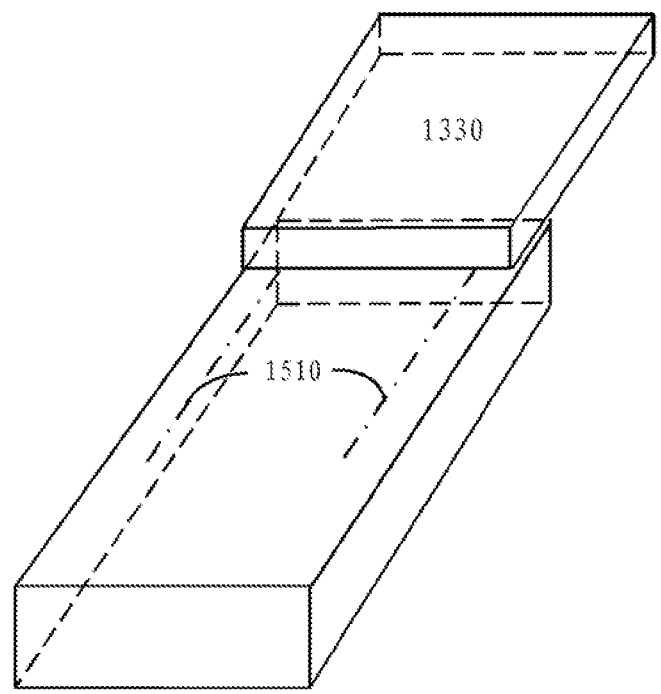

FIGS. 15A and 15B are schematic diagrams showing the hand-held electronic device according to another embodiment of the present disclosure. In the example shown in FIGS. 15A and 15B, the cover component 1330 in the hand-held electronic device 1300 shown in FIG. 13 may be connected to the first surface of the slide track 1510, and is movable along the slide track 1510 with respect to the first surface.

In the second state, as shown in FIG. 15B, the user may slide the cover component 1330 so that at least the part in which the second light guiding component 1353 is disposed is separate from the first display 1320. Since the cover component 1330 has a predetermined transmittance, the real world may be seen when the user watches the first magnified virtual image to prevent the viewer from slipping, breaking into an obstacle, etc.

Figure 16:
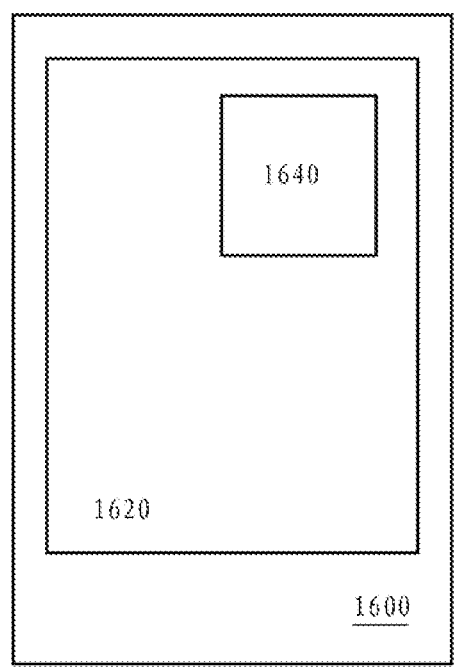
FIG. 16 is a schematic view showing a basic construction of a hand-held electronic device according to another embodiment of the present disclosure.

In addition, according to another example of the present disclosure, the second display is disposed on the first surface of the hand-held electronic device. FIG. 16 is a diagram showing the basic constructive example of the hand-held electronic device 1600 according to another embodiment of the present disclosure. Similar to the hand-held electronic device 1200 shown in FIG. 12, the hand-held electronic device 1600 comprises an image processor (not shown), a first display 1620, a cover component (not shown), and a second display 1640. The image processor, the first display 1620, the cover component and the second display 1640 are similar to the image processor 1210, the first display 1220, the cover component 1230, and the second display 1240 in FIG. 12, respectively, and are not described here to avoid redundancy.

As shown in FIG. 16, in the present embodiment, the second display 1640 is a part of the first display 1620. In particular, in the first state, the whole first display displays the first image according to the image data provided by the image processor. In the second state, the first part of the first display 1620 functions as the second display 1640, and the first part displays according to the image data provided by the image processor. In addition, when the hand-held electronic device is in the second state, the cover component covers the first display 1620 to protect the first display 1620.

According to an example of the present disclosure, the resolution of the first display 1620 is adjustable. For example, the first display 1620 may have a low resolution display mode and a high resolution display mode. In particular, in the first state, the first display 1620 may set its resolution to be low, to allow the viewer to see the first image displayed by the first display 1512 directly. That is, it is not necessary to change the light path through the optical system, and the viewer may see the first image displayed by the first display 1620 directly. In the second state, the first display 1620 may set is resolution to be high, to display the second image according to the data provided by the image processor.

In addition, to reduce the power consumption and the production cost, only a part of the first display 1620 may be set to display with a higher resolution or a lower resolution, and the other part is set to display with a lower resolution only.

In addition, to reduce the power consumption, according to an example of the present disclosure, the hand-held electronic device 1600 may also comprise a power supplier. The power supplier may be connected with the first part and the remaining part in the first display other than the first part, respectively, to supply the first part and the other part with power. In the second state, the power supplier may stop supplying power to the remaining part to save power of the display.

Similar to the hand-held electronic device 1200, the hand-held electronic device 1600 may not comprise the first optical system. For example, the first optical system is constructed to be a component separate from the hand-held electronic device 1600. In the second state, the component may be placed on top of the cover component to receive the light emitted from the second display through the first optical system and change the light path of the light emitted from the second display to form the first magnified virtual image corresponding to the second image.

In addition, according to an example of the present disclosure, the hand-held electronic device shown in FIG. 16 may also comprise an image capturing module to capture the surrounding image. The image capturing module may be for example a camera or a video camera. In particular, the image capturing module may be disposed on the second surface of the hand-held electronic device. The second surface may be opposite to the first surface of the first display. The image capturing module may capture the surrounding image and transmit the captured surrounding image to the image processor. When the hand-held electronic device is in the second state, the remaining part in the first display other than the first part may display a third image according to the image data on the surrounding image provided by the image processor. Thereby, the user may see the surroundings when watching the first magnified virtual image.

In addition, according to an example of the present disclosure, the image processor may also comprise an image recognition module. The image recognition module may recognize the target capturing object in the surrounding image and obtain hint information according to the target capturing object. For example, when the target capturing object is a building, the hint information may be the name, the comment, etc. of the building. According to an example of the present disclosure, the image recognition module may search the database in the hand-held electronic device for the hint information. Alternatively, the image recognition module may retrieve the hint information on the target capturing object through network. The image processor may generate the third image according to the hint information.

According to another example of the present disclosure, the image processor in the hand-held electronic device may also determine the main color in the surrounding image captured by the image capturing module and control the color of the background picture displayed by the first display, according to the main color of the surrounding image, to prevent the user from seeing a black background when watching the first magnified virtual image, and thus, improving the viewing experience.

Alternatively, the hand-held electronic device 1600 may comprise a first optical system. For example, the first optical system may be connected with the main body of the hand-held electronic device 1600 by a connection component such as a pivot, a slide track, etc. In the first state, at least a part of the first optical system is separate from the first display, to prevent the first display from being blocked. According to an example of the present disclosure, the hand-held electronic device 1600 may also comprise a pivot, which is rotatable about its center. The first optical system may be connected to the pivot and is rotatable about the center of the pivot. In the first state, the first optical system may be rotated to be separate from the first display. In the second state, the first optical system may be rotated to cover the first part of the first display, which functions as the second display. Alternatively, the first optical system may be connected to the cover component by a slide track, and is movable along the slide track with respect to the cover component. In the first state, the first optical system may be moved to be separate from the first display. In the second state, the first optical system may be moved to cover the first part of the first display, which functions as the second display.

With the hand-held electronic device provided in the above embodiment, the second image to be magnified may be displayed with a higher resolution by the first part of the first display, by adjusting the resolution of the first surface of the hand-held electronic device. Therefore, it is not necessary to configure a separate second display in the hand-held electronic device, so that the inside construction of the hand-held electronic device is simplified and facilitates the design of the hand-held electronic device to be thinner and lighter.

It is to be noted that although the above description is made with the case as an example in which the second display disposed on the first surface is contained in the first display, the present disclosure is not limited thereto. For example, the second display is disposed on the first surface of the hand-held electronic device and is separate from the first display. In the second state, the second display may display with a higher resolution. In the first state, the second display may be turned off to save power, or, the second display may display with a lower resolution that is the same as that of the first display, to extend the content displayed by the first display.

Additionally, according to another example of the present disclosure, the hand-held electronic device shown in FIG. 12, 13 or 16 may also comprise an adjustor. In the second state, the adjustor may adjust the second display and/or the first optical system, according to the first position of the eye watching the first magnified virtual image.

For example, in the example shown in FIG. 13, the adjustor may adjust the inclining angle of the light reflective component disposed in the cover component according to the first position of the eye watching the first magnified virtual image, so as to change the reflective direction and/or the setting position of the reflective component to enable the user to see the first magnified virtual image clearly. In particular, the light reflective component may be a light film such as a PDLC (Polymer Dispersed Liquid Crystal) thin film. In particular, the PDLC thin film comprises liquid crystal and polymer. When a voltage is applied to the PDLC thin film, the optical axis of the liquid crystal particle is perpendicular to the surface of the PDLC thin film, that is, consistent with the electric field. The light reflective index of the liquid crystal particle matches with the reflective index of the polymer essentially, and there is no obvious interface, which forms a substantially uniform medium, so that the incident light will not be scattered, and the PDLC thin film appears transparently. When there is no voltage applied to the PDLC thin film, there is no regular electric field between the PDLC thin films. The optical axis of the liquid crystal particle is taken in random, and appears an out-of-order state. The reflective index n1 of the liquid crystal particle does not match with the reflective index n2 of the polymer, so that the incident light is scattered largely, and the PDLC thin film appears a non-transparent state or a translucent state. The transmittance of the light reflective component may be any digital value between 0% and 100%. In addition, as described above, the inclining angle of the light reflective component disposed in the transparent protective component may be adjusted according to the first position of the eye watching the first magnified virtual image, to change the reflective direction thereof, so that the user may see the first magnified virtual image clearly.

For another example, in the example shown in FIG. 16, the adjustor may adjust the setting position of the first part as the second display in the first display, according to the first position of the eye watching the first magnified virtual image.

According to an example of the present disclosure, the adjustor may comprise a knob section, and the viewer may adjust the first display and/or the first optical system manually, based on the first position of the eye watching the first magnified virtual image. Alternatively, according to another embodiment of the present disclosure, the hand-held electronic device may comprise a second detector. The second detector may detect the first position of the eye watching the first magnified virtual image, when the viewer comes close to the first window, to enable the adjustor to adjust the first display and/or the first optical system automatically, based on the first location detected by the second detector.

For example, the second detector may comprise an image capturing module and a recognition module. The image capturing module may capture the face image of the user when the viewer comes close to the first window to determine the first position of the eye watching the first magnified virtual image. Additionally, the second detector may comprise an infrared ray emission module. The infrared ray emission module may emit infrared ray to the viewer. The recognition module may determine the first position of the eye watching the first magnified virtual image, based on the reflective infrared image from the viewer or by combining the reflective infrared image from the viewer with the face image obtained by the image capturing module. The time for detecting the first position by the second detection module may be shorten by means of the reflective infrared image.

With the hand-held electronic device provided in the embodiment of the present disclosure, the first display and/or the first optical system may be adjusted based on the position of the viewer eye, for convenience of the user watching the first magnified virtual image, thereby improving the watching experience of the user.

Moreover, in another example of the present disclosure, the hand-held electronic device shown in FIG. 12, 13, or 16 may also comprise a third optical system. Similar to the second display, when the hand-held electronic device is in the second state, the third display may display the second image according to the image data provided by the image processor. In the second state, light emitted from the third display may be received and the light path is changed to form a second magnified virtual image. In the second state, the viewer may see the second magnified virtual image through the second optical system when the viewer comes close to the first optical system, so that the viewer is able to see the magnified image with both eyes at the same time.

Figure 17:
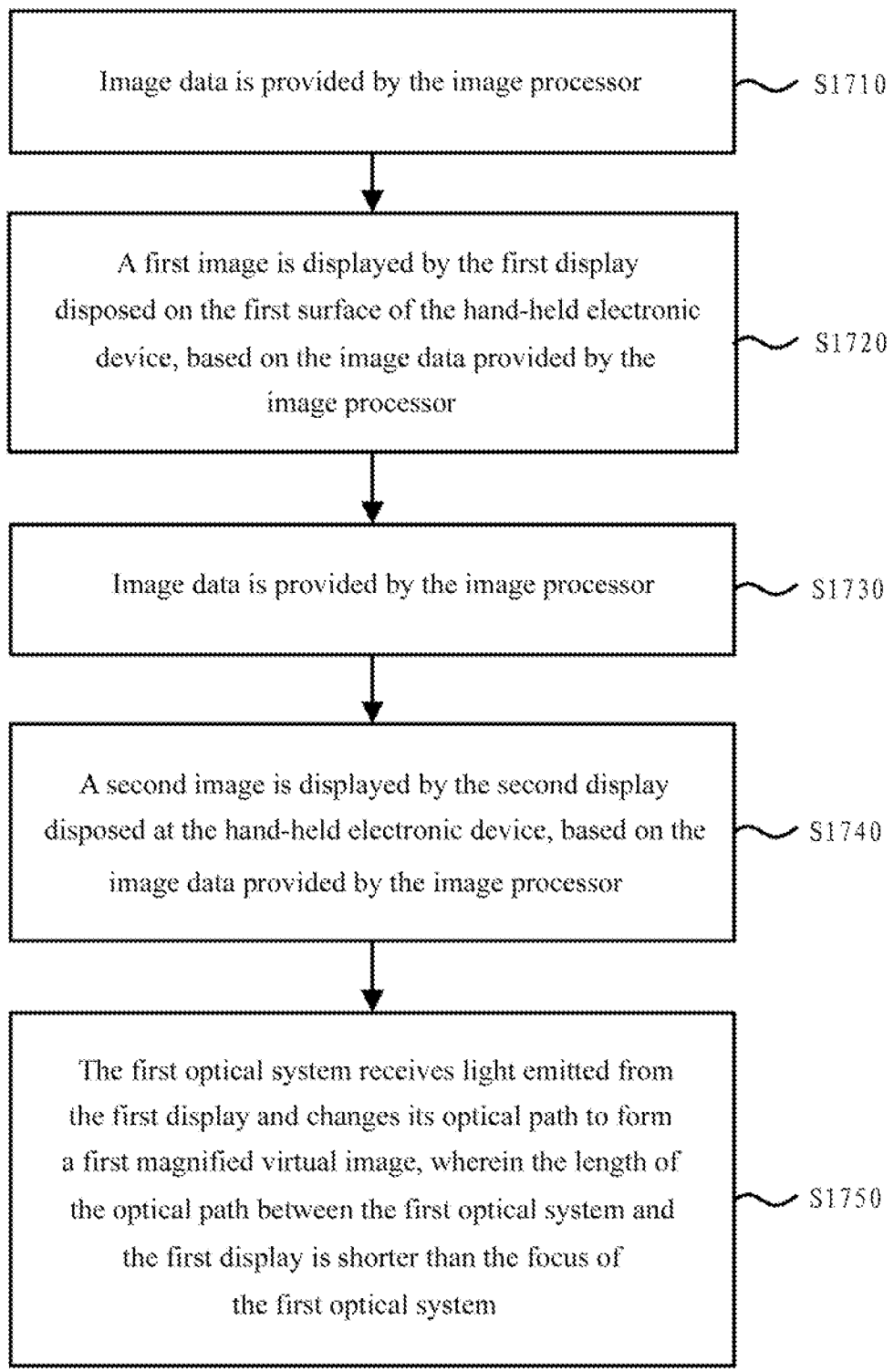
FIG. 17 is a flowchart showing a display method according to an embodiment of the present disclosure.

In the following, the display method according to the embodiment of the present disclosure will be described with reference to FIG. 17. FIG. 17 is a flowchart showing the display method 700 according to the embodiment of the present disclosure. The display method 1700 may be applied to a hand-held electronic device having a first state and a second state. The individual steps of the display method 1700 may be realized by the corresponding modules in the hand-held electronic device shown in FIG. 12, and will not be described here in detail for briefness.

As shown in FIG. 17, in the first state, in step S1710, image date is provided by the image processor. The first image may be, for example, a picture, a video image, or a combination of a text and a picture. The image processor may be a central image processing unit (for example, CPU) of the hand-held electronic device, or alternatively, may be a separate image processor disposed physically or logically.

In step S1720, the first image is displayed by the first display on the first surface of the hand-held electronic device, according to the image data provided by the image processor. In the first state, the first display allows the viewer to see the second image directly. That is, it is not necessary to change the light path of the image displayed by the second display through an optical system. The viewer may see the second image displayed by the first display directly.

Additionally, in the first state, the cover component of the hand-held electronic device covers the first display to protect the first display. According to an example of the present disclosure, the cover component has a predetermined transmittance. Thereby, when the cover component covers the first display, the viewer may still see the first image displayed on the first display.

On the other hand, in the second state, in step S1730, the image data is provided by the image processor. In step S1740, the second image is displayed by the second display disposed in the hand-held electronic device according to the image data provided by the image processor. According to an example of the present disclosure, the second display has a higher resolution and a smaller size. For example, the second display may employ a display screen meeting the high definition or the full high definition standard.

In step S1750, the first optical system receives light emitted from the first display and changes the light path to form a first magnified virtual image, wherein the length of the light path between the first optical system and the first display is smaller than the focus of first optical system. In the second state, when the viewer comes close to the first optical system, he or she may see the first magnified virtual image through the first optical system. According to an example of the present disclosure, the first optical system is constructed to be a component separate from the hand-held electronic device. Alternatively, the hand-held electronic device may comprise the first optical system. For example, the first optical system may be connected with the main body of the hand-held electronic device by a connection component such as a pivot, a slide track, etc.

According to an example of the present disclosure, the first optical system comprises at least a lens assembly having a positive reflective power. For example, the lens assembly may comprise a convex lens. In addition, to reduce and avoid the interference to imaging caused by aberration and dispersion to bring better visual experience to users, the lens assembly may be formed of a plurality of lenses including the convex lens and the concave lens. As described above, this lens assembly formed of a plurality of lenses has a positive refractive power, i.e., is equivalent to a convex lens.

By the display method provided by the above embodiment of the disclosure, the watchable image size is not limited to the screen size of the hand-held device itself, such that the user may see a display image with a relatively big size through the hand-held device while the portability of the hand-held device is kept. Additionally, compared with a micro-projector, the hand-held device according to this embodiment has a considerably low consumption and is not limited by ambient light. The hand-held device according to the embodiment of the disclosure may be used to watch a video or a picture both in outdoors with strong light and indoors with weak light.

Additionally, as described above, since the viewer can see the first magnified virtual image through the first optical system only when close to the first external surface, such that the content seen by the user is prevented from being seen by others so as to improve the privacy.

According to the method of the embodiment of the disclosure, the first state in which the hand-held electronic device displays a first image by the first display (e.g., the first state may be a normal use state of a mobile phone when the hand-held electronic device is the mobile phone), and the second state of the hand-held electronic device may be switched between each other, so as to control the on and off of the second display. Thereby, when the viewer does not need to watch enlarged magnified image, the second display is turned off to save power.

It is to be noted that in the embodiments described above, the expressions such as "the first" and "the second' etc. is used to distinguish one component from the other component. However, it does not mean that those components have to be realized by separate components physically or logically. Actually, those skilled in the art may understand that one or more such components may be integrated together physically or logically, and the present disclosure will also be realized when a component or a state referred to as "the first . . . " in the above description is referred to as "the second . . . ", while a component or a state referred to as "the second . . . " in the above description is referred to as "the first . . . ".

According to an embodiment of the present disclosure, a hand-held electronic device is provided, comprising an image processor configured to display a first image; a first display configured to display the first image; a first optical system configured to receive light emitted from the first display and change the light path of the light emitted from the first display to form a first magnified virtual image, wherein the length of the light path between the first optical system and the first display is shorter than the focus of the first optical system; and a first window disposed on a first external surface of the hand-held electronic device, to allow a viewer to see the first magnified virtual image through the first optical system when the viewer comes close to the first external surface.

The hand-held electronic device further comprises a capturing module configured to capture an eye image of the viewer when the viewer comes close to the first external surface to see the first magnified virtual image; a recognizing module configured to perform image recognition on the eye image captured by the capturing module to generate a recognition result; and a controller configured to generate a control instruction according to the recognition result and transmit the control instruction to the image processor.

In the hand-held electronic device, the eye image comprises an iris image, and the recognizing module performs iris recognition on the iris image to generate the recognition result.

In the hand-held electronic device, when the recognition result indicates that the iris image matches with iris information stored in advance, the controller generates a first control instruction to switch the hand-held electronic device to a first state; when the recognition result indicates that the iris image does not match with the iris information stored in advance, the controller generates a second control instruction to switch the hand-held electronic device to a second state.

In the hand-held electronic device, the image processor is allowed to provide the first image in the first state, and is forbidden to provide the first image in the second state.

In the hand-held electronic device, the recognition result comprises an eye state parameter; the controller generates the control instruction according to the eye state parameter and transmits the control instruction to the image processor to control the first image provided by the image processor.

In the hand-held electronic device, the first display comprises a display array containing multiple display components; the capturing module comprises a capturing array containing multiple capturing components; wherein, the first display, the capturing module, the first optical system and the first window are disposed along the optical axis of the first optical system correspondingly.

In the hand-held electronic device, the display array and the capturing array are disposed in such a manner that a capturing component is disposed between two adjacent displaying components.

In the hand-held electronic device, the capturing module, the first display, the first optical system and the first window are disposed along the optical axis of the first optical system correspondingly, and the capturing module is disposed on a side of the first display far away from the first window; the light incident from the first window is capable of passing the first display when displaying the first image.

In the hand-held electronic device, the capturing module comprises a first optical component disposed correspondingly to the first window, wherein the first optical component is capable of transmitting light irradiated in a first direction to allow the light the light path of which is changed by the first optical system to pass the first optical component, and is capable of reflecting light irradiated in a second direction, to transfer an eye image signal of the viewer to a capturing component when the viewer comes close to the first external surface to see the first magnified virtual image; and the capturing component configured to capture the eye image based on the eye image signal transferred from the first optical component.

According to another embodiment of the present disclosure, a display method applied to a hand-held electronic device is provided, comprising providing a first image by an image processor; displaying the first image by a first display; receiving light emitted from the first display and changing the light path of the light emitted from the first display to form a first magnified virtual image by a first optical system, wherein the length of the light path between the first optical system and the first display is shorter than the focus of the first optical system.

The method further comprises capturing an eye image of the viewer when the viewer comes close to the first external surface to see the first magnified virtual image; performing image recognition on the eye image captured by the capturing module to generate a recognition result; and generating a control instruction according to the recognition result and transmitting the control instruction to the image processor.

In the method, the eye image comprises an iris image, and the recognizing comprises performing iris recognition on the iris image to generate the recognition result.

In the method, the recognition result comprises an eye state parameter; the step of generating comprises generating the control instruction according to the eye state parameter and transmitting the control instruction to the image processor to control the first image provided by the image processor.

According to another embodiment of the present disclosure, a hand-held electronic device is provided, comprising an image processor configured to provide a first image; a first display configured to display the first image; a first optical system configured to receive light emitted from the first display and change the light path of the light emitted from the first display to form a first magnified virtual image, wherein the length of the light path between the first optical system and the first display is shorter than the focus of the first optical system; a first window configured to allow a viewer to see the first magnified virtual image through the first optical system when the viewer comes close to the first window.

The hand-held electronic device further comprise an adjustor configured to adjust the first display, the first optical system and/or the first window according to a first position of the eye watching the first magnified virtual image.

The hand-held electronic device further comprises a detector configured to detect the first position of the eye watching the first magnified virtual image when the viewer comes close to the first window.

The hand-held electronic device further comprises a second optical system configured to receive light emitted from the first display and change the light path of the light emitted from the first display to form a second magnified virtual image; wherein the length of the light path between the second optical system and the first display is shorter than the focus of the second optical system; a second window configured to allow the viewer to see the second magnified virtual image through the second optical system when the viewer comes close to the second window.

In the hand-held electronic device, the first display is disposed on a first surface of the hand-held electronic device; the first optical system and the first window covers the first display when the first magnified virtual image is watched; and the adjustor adjusts the first display covered with the first optical system and the first window according to the first position.

In the hand-held electronic device, the first display is configured to display the first image provided by the image processor through a first part of a display screen of the first display; the adjustor adjusts a first setting position of the first part in the display screen of the first display according to the first position; the first optical system receives light emitted from the first part and changes the light path conversion to form the first magnified virtual image, wherein the length of the light path between the first optical system and the first part is shorter than the focus of the first optical system.

In the hand-held electronic device, the first display is configured to display the first image provided by the image processor through a second part of a display screen of the first display; the hand-held electronic device further comprises a second optical system configured to receive light emitted from the second part and change the light path of the light emitted from the second part to form a second magnified virtual image; wherein the length of the light path between the second optical system and the second part is shorter than the focus of the second optical system; a second window configured to allow the viewer to see the second magnified virtual image through the second optical system when the viewer comes close to the second window; the adjustor adjusts a second setting position of the second part in the display screen of the first display according to a second position of the eye watching the second magnified virtual image.

The hand-held electronic device further comprises a pivot rotatable about its center; a first casing connected with the pivot so that the first casing is rotatable about the pivot center; wherein the first optical system and the first window are disposed in the first casing; and a second casing connected with the pivot, so that the second casing is rotatable about the pivot center; wherein the first display is disposed on a first surface of the second casing.

The hand-held electronic device further comprise a first casing connected with a second casing of the hand-held electronic device by a slide track, and is movable along the slide track with respect to the second casing; wherein the first optical system and the first window are disposed in the first casing; the second casing connected with the first casing of the hand-held electronic device by the slide track, and is movable along the slide track with respect to the first casing, wherein the first display is disposed on a first surface of the second casing.

In the hand-held electronic device, the first display and the first optical system are disposed in the hand-held electronic device; the first window is disposed on a second surface of the hand-held electronic device; the first display, the first optical system and the first window are disposed correspondingly along the optical axis of the first optical system; the adjustor adjusts a third setting position of the first window on the first external surface according to the first position, and adjusts the emission direction of the first display and the direction in which the optical axis of the first optical system locates according to the third setting position.

The hand-held electronic device further comprises a second display configured to display the first image; a second optical system configured to receive light emitted from the second display and change the light path of the light emitted from the second display to form a second magnified virtual image; wherein the length of the light path between the second optical system and the second display is shorter than the focus of the second optical system; a second window configured to allow the viewer to see the second magnified virtual image through the second optical system when the viewer comes close to the second window; wherein the second display and the second optical system are disposed in the hand-held electronic device, the second window is disposed on a second surface of the hand-held electronic device; the second display, the second optical system and the second window are disposed along the optical axis of the second optical system correspondingly; the adjustor adjusts a fourth setting position of the first window on the first external surface according to the second position of the eye watching the second magnified virtual image, and adjusts the emission direction of the second display and the direction in which the optical axis of the second optical system locates according to the fourth setting position.

In the hand-held electronic device, the first display is disposed in the hand-held electronic device; the first window is disposed on a third surface of the hand-held electronic device; the adjustor adjusts the first optical system according to the first position.

In the hand-held electronic device, the first optical system comprises a first lens assembly configured to receive light emitted from the first display and change the light to form the first magnified virtual image; a first light guiding component configured to reflect the light passing the first lens assembly to the viewer through the first window; the first window is a transparent protective component on the third surface; the first light guiding component is disposed in the transparent protective component; and the adjustor adjusts the first light guiding component according to the first position.

The hand-held electronic device further comprises a second display configured to display the first image; a second optical system configured to receive light emitted from the second display and change the light path of the light emitted from the second display to form a second magnified virtual image; wherein the length of the light path between the second optical system and the second display is shorter than the focus of the second optical system; wherein the first window is further configured to allow the viewer to see the second magnified virtual image through the second optical system when the viewer comes close to the first window; the second display is disposed in the hand-held electronic device; the second optical system comprises: a second lens assembly configured to receive light emitted from the second display and change the light path conversion to form the second magnified virtual image; a second light guiding component disposed in the transparent protective component, configured to reflect the light passing the second lens assembly to the viewer through the first window; the adjustor adjusts the second light guiding component according to the second position of the eye watching the second magnified virtual image.

The hand-held electronic device further comprises a third display configured to display the second image, wherein, the display area of the third display is larger than that of the first display, the third display allows the viewer to watch the second image directly. The transparent protective component covers on top of the third display and is disposed in lamination with the third display.

The hand-held electronic device further comprises a pivot rotatable about its center; a first casing connected with the pivot so that the first casing is rotatable about the pivot center; wherein the transparent protective component is disposed on the third surface of the first casing; and a second casing connected with the pivot, so that the second casing is rotatable about the pivot center.

The hand-held electronic device further comprises a first casing connected with a second casing of the hand-held electronic device by a slide track, and is movable along the slide track with respect to the second casing; wherein the transparent protective component is disposed on the third surface of the first casing; the second casing connected with the first casing of the hand-held electronic device by the slide track, and is movable along the slide track with respect to the first casing.

According to another embodiment of the present disclosure, a display method applied to a hand-held electronic device is provided, comprising providing a first image by an image processor; displaying the first image by a first display; receiving light emitted from the first display and changing the light path of the light emitted from the first display by a first optical system to form a first magnified virtual image, wherein the length of the light path between the first optical system and the first display is shorter than the focus of the first optical system.

The display method further comprises adjusting the first display and/or the first optical system according to a first position of the eye watching the first magnified virtual image.

The display method further comprises detecting the first position of the eye watching the first magnified virtual image when the viewer comes close to the first window.

According to another embodiment of the present disclosure, a hand-held electronic device having a first state and a second state is provided, comprising an image processor configured to provide image data; a first display disposed on a first surface of the hand-held electronic device, configured to display a first image according to the image data provided by the image processor, when the hand-held electronic device is in the first state; a cover component configured to cover the first display to protect the first display at least when the hand-held electronic device is in the first state; a second display configured to display a second image according to the image data provided by the image processor, when the hand-held electronic device is in the second state; wherein, in the second state, light emitted from the second display is received and the light path of the light is changed to form a first magnified virtual image corresponding to the second image, wherein a viewer is able to see the first magnified virtual image through the first optical system when the viewer comes close to the first window when the hand-held electronic device is in the second state.

In the hand-held electronic device, the second display is disposed in the hand-held electronic device; the hand-held electronic device comprises the first optical system; the first optical system comprises: a first lens assembly disposed in the hand-held electronic device, configured to receive light emitted from the second display and change the light path conversion to form the first magnified virtual image; a first light guiding component configured to reflect the light passing the first lens assembly to a second light guiding component; the second light guiding component is disposed in the cover component, configured to receive the light transmitted thereto and reflect it to a side opposite to the first display.

In the hand-held electronic device, the cover component has a predetermined transmittance; in the second state, at least a part of the cover component is separate from the first display, so that the cover component does not overlap with the position where the viewer watches the first magnified virtual image.

The hand-held electronic device further comprises a pivot disposed on a first side of the first surface of the hand-held electronic device and is rotatable about its center; the cover component is connected to the pivot so that the cover component is rotatable about the pivot center.

In the hand-held electronic device, the cover component is connected to the first surface by a slide track and is movable along the slide track with respect to the first surface.

In the hand-held electronic device, the second display is disposed on the first surface of the hand-held electronic device, and is separate from the first display.

In the hand-held electronic device, the second display is a part of the first display; in the first state, the first display as a whole displays the first image according to the image data provided by the image processor; in the second state, a first part of the first display functions as the second display, and the first part displays the second image according to the image data provided by the image processor; when the hand-held electronic device is in the second state, the cover component covers the first display to protect the first display.

In the hand-held electronic device, the whole first display displays with a first resolution in the first state; the first part of the first display displays with a second resolution higher than the first resolution in the second state.

The hand-held electronic device further comprises a power supplier connected with the first part and the remaining part in the first display other than the first part, respectively, configured to supply power to the first part and the remaining part;

wherein, the power supplier stops supplying power to the remaining part in the second state.

The hand-held electronic device further comprises an image capturing module configured to capture a surrounding image and transmit the captured surrounding image to the image processor; wherein the image capturing module is disposed on a second surface of the hand-held electronic device; the remaining part in the first display other than the first part displays a third image according to image data on the surrounding image provided by the image processor, when the hand-held electronic device is in the second state.

In the hand-held electronic device, the hand-held electronic device comprises a first optical system, at least a part of which is separate from the first display in the first state.

The hand-held electronic device further comprises a pivot disposed on a first side of the first surface of the hand-held electronic device and is rotatable about its center; the first optical system is connected to the pivot so that the first optical system is rotatable about the pivot center.

In the hand-held electronic device, the first optical system is connected to the cover component by a slide track and is movable along the cover component with respect to the first surface.

The hand-held electronic device further comprises an adjustor configured to adjust the second display and/or the first optical system according to the first position of the eye watching the first magnified virtual image.

The hand-held electronic device further comprises a detector configured to detect a first watching position of the eye watching the first magnified virtual image when the viewer comes close to the first optical system, wherein the adjustor adjusts the second display and/or the first optical system according to the first watching position.

The hand-held electronic device further comprises a third display configured to display the second image according to the image data provided by the image processor, when the hand-held electronic device is in the second state; wherein, when in the second state, the light emitted from the third display is received through a second optical system and the light path of the light is changed to form a second magnified virtual image; wherein, the viewer is able to see the second magnified virtual image through the second optical system when the viewer comes close to the first optical system.

According to another embodiment of the present disclosure, a display method applied to a hand-held electronic device having a first state and a second state is provided, comprising providing image data by an image processor; displaying a first image by a first display disposed on a first surface of the hand-held electronic device, according to the image data provided by the image processor, when the hand-held electronic device is in the first state; wherein, a cover component of the hand-held electronic device covers the first display to protect the first display in the first state; image data is provided by the image processor and a second image is displayed by a second display according to the image data provided by the image processor, when the hand-held electronic device is in the second state; wherein, in the second state, light emitted from the second display is received and the light path is changed to form a first magnified virtual image corresponding to the second image, wherein the length of the light path between the first optical system and the first display is shorter than the focus of the first optical system; and wherein, a viewer is able to see the first magnified virtual image through the first optical system when the viewer comes close to the first window when the hand-held electronic device is in the second state.

Those skilled in the art may recognize that the disclosure can be achieved by electronic hardware, computer software or a combination of both, combined with units and algorithms in respective example described by the embodiments. In order to illustrate the exchangeability of the hardware and software clearly, the compositions and steps of the respective examples have already been described generally by functional steps. Whether these functions are performed by software or hardware depends on the specific applications and constriction conditions for design of the technical solution. Those skilled in the art may use different methods for each of specific application to achieve the functions described, but such an achievement should not be considered to go beyond the scope of the disclosure.

Those skilled in the art should understand that various modifications, combinations, partial combinations, and alternations might be made to the disclosure depending on the design requirement and other factors, as long as they are within the scope of the appended claims and their equivalents.

What is claimed is:

1. A hand-held electronic device, comprising:
an image processor configured to provide image data;
a first display configured to display a first image based on the image data;
a first optical system configured to receive light emitted from the first display and change a light path of the light emitted from the first display to form a first magnified virtual image, wherein a length of the light path between the first optical system and the first display is shorter than a focus of the first optical system; and
a first window configured to allow a viewer to see the first magnified virtual image through the first optical system when the viewer comes close to the first window, wherein the first window is disposed on a first external surface of the hand-held electronic device, and the hand-held electronic device further comprises:
a capturing module configured to capture an eye image of the viewer when the viewer comes close to the first external surface to see the first magnified virtual image;
a recognizing module configured to perform image recognition on the eye image captured by the capturing module to generate a recognition result; and
a controller configured to generate a control instruction according to the recognition result and transmit the control instruction to the image processor.

2. The hand-held electronic device of claim 1, wherein,
the eye image comprises an iris image;
the recognizing module performs iris recognition on the iris image to generate the recognition result;
when the recognition result indicates that the iris image matches with iris information stored in advance, the controller generates a first control instruction to switch the hand-held electronic device to a first processing state; and
when the recognition result indicates that the iris image does not match with the iris information stored in advance, the controller generates a second control instruction to switch the hand-held electronic device to a second processing state.

3. The hand-held electronic device of claim 1, wherein,
the recognition result comprises an eye state parameter; and
the controller generates the control instruction according to the eye state parameter and transmits the control instruction to the image processor to control the image data provided by the image processor.

4. The hand-held electronic device of claim 1, wherein,
the capturing module, the first display, the first optical system, and the first window are disposed along the optical axis of the first optical system correspondingly, and the capturing module is disposed on a side of the first display far away from the first window; and
the light incident from the first window is capable of passing the first display when displaying the first image.

5. The hand-held electronic device of claim 1, wherein, the capturing module comprises:
a first optical component disposed correspondingly to the first window, wherein the first optical component is capable of transmitting light irradiated in a first direction to allow the light of the light path which is changed by the first optical system to pass the first optical component, and is capable of reflecting light irradiated in a second direction, to transfer an eye image signal of the viewer to a capturing component when the viewer comes close to the first external surface to see the first magnified virtual image; and
the capturing component configured to capture the eye image based on the eye image signal transferred from the first optical component.

6. The hand-held electronic device of claim 1, further comprising an adjustor configured to adjust the first display, the first optical system and/or the first window according to a first position of the eye watching the first magnified virtual image.

7. The hand-held electronic device of claim 6, further comprising a detector configured to detect the first position of the eye watching the first magnified virtual image when the viewer comes close to the first window.

8. The hand-held electronic device of claim 1, wherein, the hand-held electronic device has a first state and a second state, the hand-held electronic device further comprises:
a second display disposed on a first surface of the hand-held electronic device, configured to display a second image according to the image data provided by the image processor, when the hand-held electronic device is in the second state; and
a cover component configured to cover the second display to protect the second display at least when the hand-held electronic device is in the second state;
wherein, the first display is configured to display the first image according to the image data provided by the image processor when the hand-held electronic device is in the first state.

9. The hand-held electronic device of claim 8, wherein,
the first display is disposed in the hand-held electronic device;
the hand-held electronic device comprises the first optical system;
the first optical system comprises:
a first lens assembly disposed in the hand-held electronic device, configured to receive the light emitted from the first display and change the light path thereof to form the first magnified virtual image;
a first light guiding component configured to transfer the light passing the first lens assembly to a second light guiding component; and
the second light guiding component disposed in the cover component, configured to receive the light transferred thereto and reflect it to a side opposite to the second display.

10. The hand-held electronic device of claim 8, wherein,
the cover component has a predetermined transmittance; and
in the first state, at least a part of the cover component is separate from the second display, so that the cover component does not overlap with the position where the viewer watches the first magnified virtual image.

11. The hand-held electronic device of claim 8, wherein,
the first display is disposed on the first surface of the hand-held electronic device, and is separate from the second display; or the first display is a part of the second display;
in the second state, the second display as a whole displays the second image according to the image data provided by the image processor;
in the first state, a first part of the second display functions as the first display, and the first part displays the first image according to the image data provided by the image processor;
and when the hand-held electronic device is in the first state, the cover component covers the second display to protect the second display.

12. The hand-held electronic device of claim 11, wherein,
the whole second display displays with a second resolution in the second state; and
the first part of the second display displays with a first resolution higher than the second resolution in the first state.

13. The hand-held electronic device of claim 11, further comprising:
a power supplier connected with the first part and the remaining part in the second display other than the first part, respectively, configured to supply power to the first part and the remaining part;
wherein, the power supplier stops supplying power to the remaining part in the first state.

14. The hand-held electronic device of claim 11, further comprising:
an image capturing module configured to capture a surrounding image and transmit the captured surrounding image to the image processor; wherein the image capturing module is disposed on a second surface of the hand-held electronic device; and
the remaining part in the second display other than the first part displays a third image according to image data on the surrounding image provided by the image processor, when the hand-held electronic device is in the first state.

15. A display method applied to a hand-held electronic device, comprising:
providing image data by an image processor;
displaying a first image based on the image data by a first display; and
receiving light emitted from the first display and changing a light path of the light emitted from the first display to form a first magnified virtual image by a first optical system, wherein a length of the light path between the first optical system and the first display is shorter than a focus of the first optical system, wherein the first magnified virtual image is viewable by the viewer through the first optical system when the viewer comes close to a first window of the hand-held electronic device and wherein the first window is disposed on a first external surface of the hand-held device, the method further comprises:
capturing an eye image of the viewer when the viewer comes close to the first external surface to see the first magnified virtual image;
performing image recognition on the captured eye image to generate a recognition result; and generating a control instruction according to the recognition result and transmitting the control instruction to the image processor.

16. The method of claim 15, wherein,
the eye image comprises an iris image, and
the step of performing image recognition on the captured eye image comprises performing iris recognition on the iris image.

17. The method of claim 15, wherein,
the recognition result comprises an eye state parameter; and
the step of generating a control instruction according to the recognition result and transmitting the control instruction to the image processor comprises:
generating the control instruction according to the eye state parameter and transmitting the control instruction to the image processor to control the image data provided by the image processor.

18. The method of claim 15, further comprising adjusting the first display and/or the first optical system according to a first position of the eye watching the first magnified virtual image.

19. The method of claim 18, further comprising detecting the first position of the eye watching the first magnified virtual image when the viewer comes close to the first window, before adjusting the first display and/or the first optical system.

20. The method of claim 15, wherein the hand-held electronic device has a first state and a second state, and the method further comprises:
in the second state,
providing image data by the image processor; and
displaying a second image by a second display disposed on a first surface of the hand-held electronic device, according to the image data provided by the image processor, wherein, a cover component of the hand-held electronic device covers the second display to protect the second display in the second state;
in the first state,
displaying the first image by the first display disposed at the hand-held electronic device, according to the image data provided by the image processor, wherein, the viewer is able to see the first magnified virtual image through the first optical system when the viewer comes close to the first optical system in the first state.

* * * * *